United States Patent
Dahl et al.

(10) Patent No.: US 11,695,978 B2
(45) Date of Patent: *Jul. 4, 2023

(54) METHODS FOR GENERATING VIDEO- AND AUDIENCE-SPECIFIC ENCODING LADDERS WITH AUDIO AND VIDEO JUST-IN-TIME TRANSCODING

(71) Applicant: Mux, Inc., San Francisco, CA (US)

(72) Inventors: Jon Dahl, San Francisco, CA (US); Adam Brown, San Francisco, CA (US); Nick Chadwick, San Francisco, CA (US); Matt Ward, San Francisco, CA (US); Scott Kidder, San Francisco, CA (US); Masroor Hasan, San Francisco, CA (US); Ben Dodson, San Francisco, CA (US)

(73) Assignee: Mux, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,748

(22) Filed: May 5, 2022

(65) Prior Publication Data

US 2022/0264168 A1 Aug. 18, 2022

Related U.S. Application Data

(63) Continuation-in-part of application No. 16/820,592, filed on Mar. 16, 2020, now Pat. No. 11,343,492, and
(Continued)

(51) Int. Cl.
*H04N 7/173* (2011.01)
*H04N 21/2662* (2011.01)
(Continued)

(52) U.S. Cl.
CPC ....... *H04N 21/2662* (2013.01); *H04L 65/764* (2022.05); *H04N 21/23439* (2013.01); *H04N 21/2402* (2013.01)

(58) Field of Classification Search
CPC ......... H04N 21/2662; H04N 21/23439; H04N 21/2402; H04L 65/764
See application file for complete search history.

(56) References Cited

U.S. PATENT DOCUMENTS

| 8,169,345 B2 | 5/2012 | Evans et al. |
| 9,100,509 B1 | 8/2015 | Jia et al. |
| (Continued) | | |

OTHER PUBLICATIONS

Office Action received in U.S. Appl. No. 16/458,630 dated Apr. 1, 2021.
(Continued)

*Primary Examiner* — Annan Q Shang
(74) *Attorney, Agent, or Firm* — Run8 Patent Group, LLC; Peter Milller; Brian T. Chew

(57) ABSTRACT

A method including: populating an encoding ladder with a subset of bitrate-resolution pairs, from a set of bitrate-resolution pairs, based on a distribution of audience bandwidths; receiving a first request for a first playback segment, at a first bitrate-resolution pair in a encoding ladder, in the video from a first device; in response to determining an absence of video segments, at the first bitrate-resolution pair and corresponding to the segment, in a first rendition cache: identifying a first set of mezzanine segments, in the video, corresponding to the first playback segment; assigning the first set of mezzanine segments to a set of workers for transcoding into a first set of video segments according to the first bitrate-resolution pair; storing the first set of video segments in the first rendition cache; and based on the first request, releasing the first set of video segments to the first device.

20 Claims, 8 Drawing Sheets

Related U.S. Application Data a continuation-in-part of application No. 16/458,630, filed on Jul. 1, 2019.

(60) Provisional application No. 62/819,277, filed on Mar. 15, 2019, provisional application No. 62/694,408, filed on Jul. 5, 2018.

(51) Int. Cl.
*H04N 21/24* (2011.01)
*H04L 65/75* (2022.01)
*H04N 21/2343* (2011.01)

(56) References Cited

U.S. PATENT DOCUMENTS

| | | | |
|---|---|---|---|
| 10,116,970 B1 | 10/2018 | Banerjee | |
| 10,182,269 B1* | 1/2019 | Samant | H04N 21/2353 |
| 10,506,237 B1* | 12/2019 | Liu | H04L 65/762 |
| 10,547,856 B2 | 1/2020 | Cock et al. | |
| 10,687,095 B2* | 6/2020 | Ziskind | H04N 21/23608 |
| 10,708,587 B2* | 7/2020 | Soroushian | H04N 5/85 |
| 11,051,061 B2* | 6/2021 | Loheide | H04N 21/8456 |
| 11,395,020 B2 | 7/2022 | Phillips et al. | |
| 2002/0069265 A1 | 6/2002 | Bountour et al. | |
| 2005/0093885 A1 | 5/2005 | Savekar et al. | |
| 2008/0086570 A1 | 4/2008 | Dey et al. | |
| 2010/0306373 A1* | 12/2010 | Wormley | H04L 67/1012 |
| | | | 709/224 |
| 2010/0309987 A1* | 12/2010 | Concion | H04N 19/124 |
| | | | 375/E7.029 |
| 2011/0035669 A1 | 2/2011 | Shirali et al. | |
| 2011/0080940 A1 | 4/2011 | Bocharov et al. | |
| 2011/0145430 A1* | 6/2011 | Ha | H04L 65/612 |
| | | | 709/231 |
| 2012/0047542 A1 | 2/2012 | Lewis et al. | |
| 2012/0254456 A1 | 10/2012 | Misharam et al. | |
| 2013/0054958 A1* | 2/2013 | Braness | H04N 21/2385 |
| | | | 709/219 |
| 2013/0254346 A1 | 9/2013 | McGowan | |
| 2013/0254611 A1 | 9/2013 | Amerga et al. | |
| 2014/0025837 A1 | 1/2014 | Swenson et al. | |
| 2014/0059166 A1 | 2/2014 | Mann et al. | |
| 2014/0098985 A1 | 4/2014 | Brubeck | |
| 2014/0230003 A1* | 8/2014 | Ma | H04N 21/4147 |
| | | | 725/115 |
| 2014/0247887 A1* | 9/2014 | Brueck | H04N 19/40 |
| | | | 375/240.26 |
| 2015/0244757 A1 | 8/2015 | Zhuang et al. | |
| 2016/0127440 A1 | 5/2016 | Gordon | |
| 2016/0295216 A1 | 10/2016 | Aaron et al. | |
| 2016/0352791 A1* | 12/2016 | Adams | H04L 65/764 |
| 2017/0041422 A1 | 2/2017 | Westphal | |
| 2017/0126256 A1 | 5/2017 | Salomons et al. | |
| 2017/0140443 A1 | 5/2017 | McGowan et al. | |
| 2017/0180746 A1 | 6/2017 | Li et al. | |
| 2017/0180800 A1 | 6/2017 | Mayrand | |
| 2017/0238030 A1* | 8/2017 | Ziskind | H04N 19/00 |
| | | | 380/205 |
| 2017/0280181 A1 | 9/2017 | Ramaley | |
| 2018/0332320 A1 | 11/2018 | Barkley et al. | |
| 2019/0069046 A1 | 2/2019 | Sauer et al. | |
| 2019/0149859 A1* | 5/2019 | George | H04N 21/8547 |
| | | | 725/148 |
| 2019/0182554 A1 | 6/2019 | Schupak et al. | |
| 2019/0208245 A1 | 7/2019 | Xu | |
| 2019/0327510 A1* | 10/2019 | Kalagi | H04N 21/44209 |
| 2019/0379895 A1 | 12/2019 | Katsavounidis et al. | |
| 2019/0387224 A1* | 12/2019 | Phillips | H04N 19/115 |
| 2020/0296362 A1 | 9/2020 | Chadwick et al. | |

OTHER PUBLICATIONS

Office Action received in U.S. Appl. No. 16/458,630 dated May 13, 2020.

Office Action received in U.S. Appl. No. 16/458,630 dated Oct. 6, 2021.

Office Action received in U.S. Appl. No. 16/458,630 dated Sep. 14, 2020.

Office Action received in U.S. Appl. No. 16/820,592 dated Aug. 24, 2021.

Notice of Allowance and Fees Due for U.S. Appl. No. 16/458,630 dated Jan. 6, 2023.

* cited by examiner

METHODS FOR GENERATING VIDEO-AND AUDIENCE-SPECIFIC ENCODING LADDERS WITH AUDIO AND VIDEO JUST-IN-TIME TRANSCODING

CROSS-REFERENCE TO RELATED APPLICATIONS

This Application is a continuation-in-part application of U.S. patent application Ser. No. 16/820,592, filed on 16 Mar. 2020, which claims the benefit of U.S. Provisional Application No. 62/819,277, filed on 15 Mar. 2019, each of which is incorporated in its entirety by this reference.

This Application is also a continuation-in-part application of U.S. patent application Ser. No. 16/458,630, filed on 1 Jul. 2019, which claims the benefit of U.S. Provisional Application No. 62/694,408, filed on 5 Jul. 2018, each of which is incorporated in its entirety by this reference.

TECHNICAL FIELD

This invention relates generally to the field of video encoding and streaming and more specifically to a new and useful method for generating video specific encoding ladders in the field of video encoding and streaming. This invention relates generally to the field of audio and video transcoding and more specifically to a new and useful method for just-in-time transcoding in the field of audio and video transcoding.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
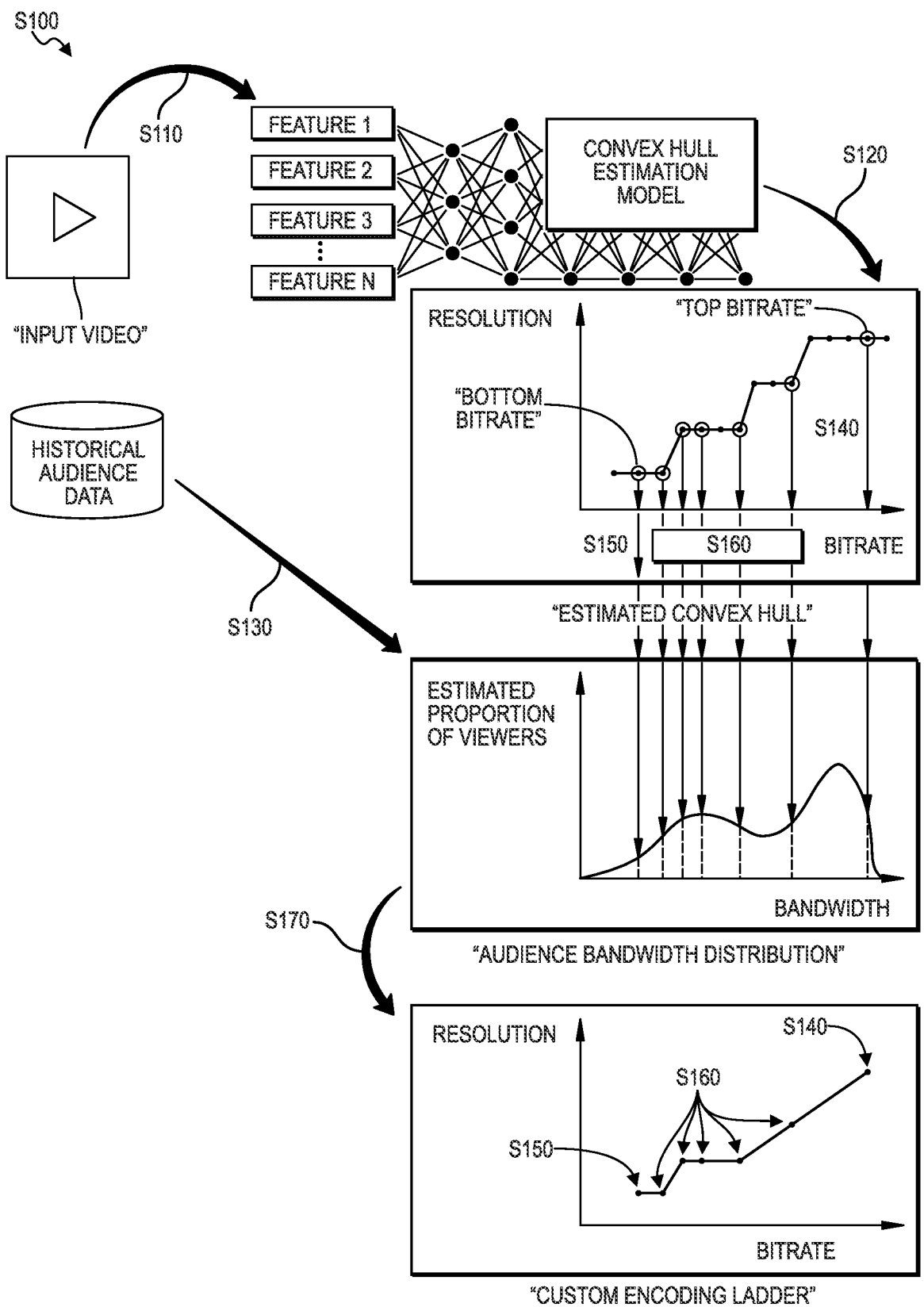
FIG. 1 is a flowchart representation of a method.

As shown in FIG. 1, a method S100 includes: extracting a set of video features representing properties of a video segment in Block S1lo; generating a set of bitrate-resolution pairs based on the set of video features via a convex hull estimation model, each bitrate-resolution pair in the set of bitrate-resolution pairs defining a bitrate and defining a resolution estimated to maximize a quality score characterizing the video segment encoded at the bitrate in Block S120; accessing a distribution of audience bandwidths representative of likely viewers of the video segment in Block S130; selecting a top bitrate-resolution pair in the set of bitrate-resolution pairs, the top bitrate-resolution pair defining a top bitrate in Block S140; selecting a bottom bitrate-resolution pair in the set of bitrate-resolution pairs, the bottom bitrate-resolution pair defining a bottom bitrate in Block S150; selecting a subset of bitrate-resolution pairs in the set of bitrate-resolution pairs based on the distribution of audience bandwidths, the subset of bitrate-resolution pairs defining bitrates less than the top bitrate and greater than the bottom bitrate in Block S160; and generating an encoding ladder for the video segment including the top bitrate-resolution pair, the bottom bitrate-resolution pair, and the subset of bitrate-resolution pairs in Block S170.

Figure 2:
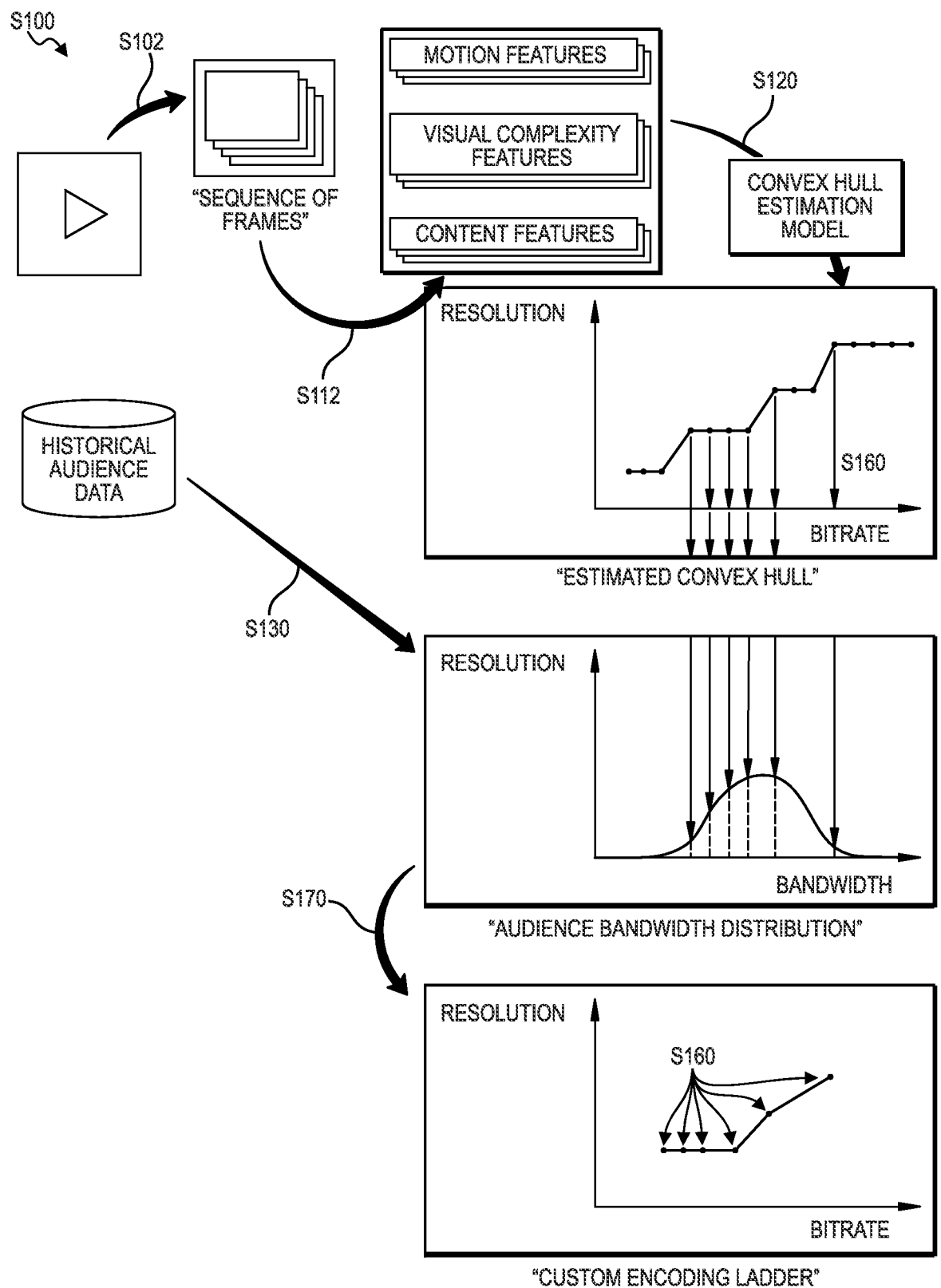
FIG. 2 is a flowchart representation of the method.

As shown in FIG. 2, a variation of the method S100 includes: sampling a sequence of frames from a video segment in Block S102; extracting a set of video features representing properties of the video segment based on the sequence of frames, the set of video features including a set of motion features, a set of visual complexity features, and a set of content features in Block S112; generating a set of bitrate-resolution pairs based on the set of video features via a convex hull estimation model, each bitrate-resolution pair in the set of bitrate-resolution pairs defining a bitrate and defining a resolution estimated to maximize a quality score characterizing the video segment encoded at the bitrate in Block S120; accessing a distribution of audience bandwidths representative of likely viewers of the video segment in Block S130; selecting a subset of bitrate-resolution pairs in the set of bitrate-resolution pairs based on the distribution of audience bandwidths in Block S160; and generating an encoding ladder for the video segment including the subset of bitrate-resolution pairs in Block S170.

Figure 3:
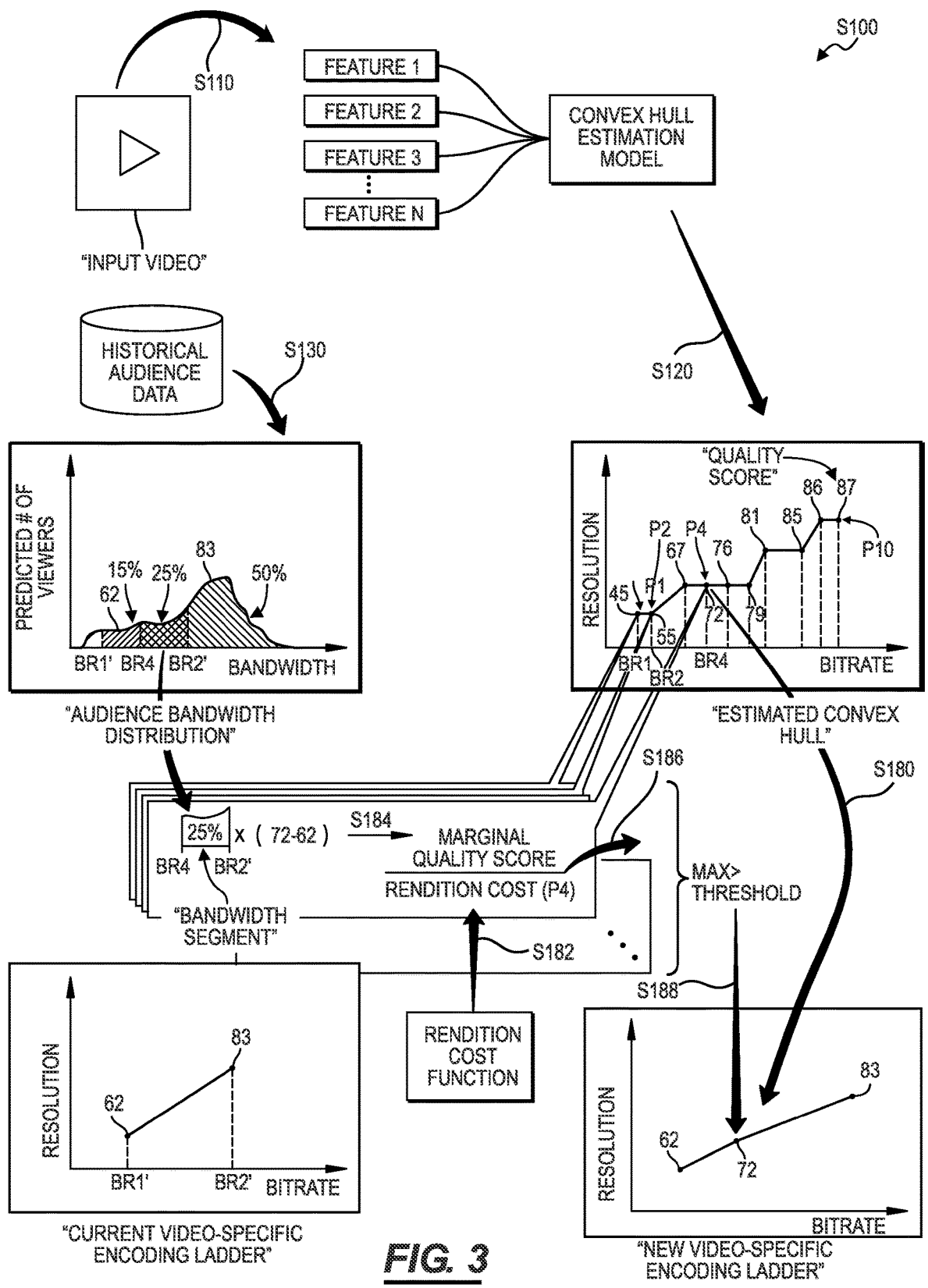
FIG. 3 is a flowchart representation of the method.

As shown in FIG. 3, a variation of the method S100 includes: extracting a set of video features representing properties of a video segment in Block Silo; generating a set of bitrate-resolution pairs based on the set of video features via a convex hull estimation model, each bitrate-resolution pair in the set of bitrate-resolution pairs defining a bitrate and defining a resolution estimated to maximize a quality score characterizing the video segment encoded at the bitrate in Block S120; accessing a distribution of audience bandwidths representative of likely viewers of the video segment in Block S130; appending successive bitrate-resolution pairs in the set of bitrate resolution pairs to an encoding ladder for the video segment based on a marginal quality-per-cost score of each bitrate-resolution pair in the set of bitrate-resolution pairs, the marginal quality-per-cost score based on the distribution of audience bandwidths and a current set of bitrate-resolution pairs in the encoding ladder in Block S180.

2. Applications

Generally, the method S100 is executed by a computer system (hereinafter "the system") to generate a video-specific encoding ladder (e.g., a manifest file, such as an HLS manifest) specific to an input video that improves video quality (e.g., compared to a fixed bitrate ladder) over a range of bitrates and resolutions based on visual-, motion-, and content-related features of the video. Additionally, the system can generate the video-specific encoding ladder without performing trial encodes of the input video, thereby enabling fast publishing times of the input video as an internet video stream and reducing the computational cost of generating the video-specific encoding ladder. Furthermore, the system can generate a video-specific encoding ladder that includes renditions of the input video that improve viewing quality over a distribution of audience bandwidths typical of viewers of the input video. Thus, the system takes in an input video and generates a video-specific encoding ladder that improves video quality based on features of the video and representative audience data in near real-time, enabling sub-ten-second publishing time for internet video streams with video-specific encoding ladders.

More specifically, the system generates the video-specific encoding ladder by: sampling a sequence of frames from an input video; extracting a set of video-level features from the sequence of frames; estimating a set of bitrate-resolution pairs that are predicted to maximize quality of the input video over a range of bitrates (e.g., 54 bitrate-resolution pairs between 250 kbps and 10,000 kbps) while controlling for the computational costs of the estimation; selecting a top bitrate and/or a bottom bitrate from the set of bitrate-resolution pairs; and selecting a subset of the bitrate-resolution pairs between the top bitrate and the bottom bitrate that improve viewing experience across a predicted distribution of audience bandwidths and bitrates (e.g., a measured or predicted distribution of bitrates for viewers of the input video).

When sampling frames from an input video, the system can select frames evenly across the duration of the input video. Alternatively, the system can intelligently sample frames from the input video that are more representative of the visual and content characteristics of the video in order to improve the accuracy of subsequent feature extraction (e.g., by sampling from each identified scene in the input video according to scene detection algorithms).

Once the system samples a sequence of frames from the input video, the system extracts a set of features based on the sequence of frames. The set of features can represent the visual complexity of the sequence of frames, the motion characteristics of the video, the content type of the video (e.g., sports, games, news, animation) and/or any other characteristic of the video. The system can extract features from the sequence of frames by calculating set of complexity and motion metrics while separately classifying the content type of the video. Additionally or alternatively, the system can utilize pre-trained machine learning models and/or computer vision models to extract a set of spatial or temporal features from the sequence of frames of the input video. Furthermore, the system can include a video-specific trained feature extraction model in order to extract features that are directly relevant to encoding decisions for the input video.

Upon extracting the set of features for the input video, the system estimates a set of bitrate-resolution pairs that are predicted to maximize the viewing quality of an encoding of the input video (i.e. a rendition of input video) at the bitrate and resolution specified by the bitrate-resolution pair. In one example, the system can estimate a quality-maximizing resolution for each bitrate in a predetermined bitrate ladder, wherein the system selects the quality-maximizing resolution for each bitrate from set of discrete resolutions (e.g., 1280×720, 1920×1080, 2560×1440). Furthermore, the system can estimate bitrate-resolution pairs that are predicted to maximize the viewing quality of a video according to a video quality metric, such as peak signal-to-noise-ratio (hereinafter "PSNR"), structural similarity index (hereinafter "SSIM"), Multiscale SSIM, or video multimethod assessment fusion (hereinafter "VMAF"). Once estimated by the system, the set of bitrate-resolution pairs can approximate a "convex hull" of encoding parameters for the input video, wherein any increase in resolution at the same bitrate or decrease in resolution at the same bitrate does not improve the viewing quality of the encoded input video.

In one implementation, the system develops a corpus of training examples and trains a machine learning model (e.g., a long short-term memory recurrent artificial neural network) in order to estimate the set of quality-maximizing bitrate-resolution pairs (i.e. the estimated convex hull) of an input video for a range of bitrates. In this implementation, each training example includes: a set of video-level features characterizing a training video; and a set of bitrate-resolution pairs that maximize the viewing quality of the training video at each bitrate. The system can then train the machine learning model by executing a supervised learning algorithm for the machine learning model based on the corpus of training examples.

After estimating a set of bitrate-resolution pairs, the system can select a top bitrate and/or a bottom bitrate of the video-specific encoding ladder. The system can select a top bitrate by estimating a bitrate above which there are diminishing returns in the quality of the encoding of the input video or by determining the bitrate that achieves a targeted visual quality. The system can also select a bottom bitrate by estimating the lowest bitrate encoding of the input video that achieves a threshold quality or by selecting a bitrate that is supported by a target percentage of a predicted viewing audience's bandwidth distribution. In one implementation, the system executes conditional logic based on the set of bitrate-resolution pairs of the input video to select the top bitrate and/or the bottom bitrate for the input video's video-specific encoding ladder. Alternatively, the system trains a second machine learning model (e.g., a boosted tree model) to select the top bitrate and/or the bottom bitrate. The second machine learning model takes in the set of bitrate-resolution pairs and outputs the top bitrate and/or bottom bitrate for the video-specific encoding ladder.

Upon selecting the top bitrate and/or bottom bitrate, the system can then select additional bitrate-resolution pairs characterized by bitrates below the top bitrate and/or above the bottom bitrate based on video audience data. The system can select any number of bitrate-resolution pairs depending on the number of renditions desired for the video-specific encoding ladder for the input video. In one implementation, the system can access a set of audience data indicating a distribution of bandwidths, which enables the system to identify the renditions that are viewable to a population of viewers (e.g., a population of viewers of a type of video similar to the input video, a general population of internet streaming viewers) and select a subset of bitrate-resolution pairs for inclusion in the video-specific encoding ladder from the set of bitrate-resolution pairs based on the distribution of viewer bandwidths indicated by the audience data. Alternatively, the system can select a subset of bitrate-resolution pairs for the video-specific encoding ladder that evenly span a range of bitrates between the top bitrate and the bottom bitrate in the set of bitrate-resolution pairs.

In another implementation, the system can iteratively calculate a marginal quality-per-cost score for each of the bitrate-resolution pairs in the convex hull, in which the marginal quality-per-cost score represents an aggregate improvement in viewing quality over the audience bandwidth distribution due to the addition of the bitrate-resolution pair to the encoding ladder in proportion to the marginal cost (e.g., encoding cost, storage cost, and/or distribution cost) of adding the bitrate-resolution pair to the encoding ladder for the input video. Upon calculating a marginal quality-per-cost score for each bitrate-resolution pair in the convex hull, the system can select the bitrate-resolution pair from the convex hull that is characterized by a maximum marginal quality-per-cost score assuming that value is greater than a threshold marginal quality-per-cost score.

Once the system generates a video-specific encoding ladder for the video, the system can encode separate renditions of the input video at the bitrate and resolution specified by each bitrate-resolution pair included in the video-specific encoding ladder. The system can then publish an internet video stream (e.g., by generating an HLS manifest file specifying available renditions of the input video) with a video-specific encoding ladder for an input video that is predicted to maximize quality at any of the bitrates included in the video-specific encoding ladder without performing additional encodes to determine the quality of the video at various bitrates and resolutions.

The term "input video," as used herein, refers to a video of any length or a video segment within a longer video. For example, the system can segment a full-length video into multiple video segments and treat each video segment as a separate input video.

The term "rendition," as used herein, refers to an encoding of a video according to a particular bitrate-resolution pair or the particular bitrate-resolution pair itself depending on context.

The term "encoding ladder," as used herein, refers to set of renditions that can be encoded and streamed based the available bitrate for the internet video stream. Thus, the stream plays back the highest bitrate rendition that is less than the viewer's available bandwidth.

3. Frame Sampling

Generally, in Block S102, the system samples a sequence of frames from the input video that represent the visual, motion, and content characteristics of the input video. More specifically, the system can access or receive a video file of the input video in an uncompressed or high-definition format from which individual frames can be reconstructed and extracted without significant encoding artifacts or blur. However, the system can access or receive an input video in any format. The system can select particular frames from the input video to extract features of the input video for analysis and to generate the video-specific encoding ladder for the input video.

In one implementation, the system samples the sequence of frames from the input video at a predetermined sampling interval within the video (e.g., one frame for every second of the input video) up to a maximum number of frames (e.g., 100 frames). The system can calculate the sampling interval for sampling frames from the input video such that the system samples up to the maximum number of frames from the input video. Alternatively, the system can sample frames at a predefined sampling interval and stop sampling upon reaching the maximum number of frames.

In another implementation, the system identifies groups-of-pictures (hereinafter "GOPs") in the original encoding of the input video and extracts at least one frame from each GOP or samples the GOPs (e.g., the I frame of each GOP) up to a maximum number of frames. More specifically, the system can identify a set of GOPs in the video segment; and sample the I-frame from each group-of-pictures in the video segment.

Alternatively, the system can execute a scene detection algorithm on the input video to detect scenes within the input video and extract a set of sample frames from each scene. Additionally, after detecting each scene in the input video, the system can cluster similar scenes and extract a set of sample frames from each cluster of scenes. Furthermore, in response to detecting scenes greater than a threshold duration in the input video, the system can segment the input video into multiple input video segments and execute Blocks of the method S100 on each input video segment.

In yet another implementation, the system can detect variability in image complexity of an input video and adjust the number and/or distribution of samples according to the variability of the input video. In one example, the system measures variability by calculating the image complexity of a first sample of frames within the video and measuring the variability (i.e. variance or standard deviation) in the image complexity of the first sample of frames. If the variability is high (e.g., above a threshold variance), the system can increase the maximum number of sample frames extracted from the input video. Alternatively, the system can respond to high variance in image complexity across frames by subsequently performing scene detection to ensure that the system extracts frames from each scene within the input video.

Additionally or alternatively, the system can extract metadata from the input video and correlate the metadata with the variability of the video. For example, the system can access a tag associated with an input video indicating that the video is a conference call and estimate that the video is characterized by low variability. After estimating the variability of the input video based on metadata, the system can extract sample frames from the input video according to the estimated variability of the input video.

The system can also sample a sequence of frames for each type of feature extracted by the system for input into the convex hull estimation model. For example, the system can: extract single frames distributed evenly in the input video in order to calculate visual complexity features and content features for the input video; and extract a set of consecutive series of frames from the input video in order to calculate motion features for the input video. Thus, the system can sample sequences of frames from the input video that best represent the input video for the purpose of various metrics and/or models.

4. Feature Extraction

Generally, in Block S110, the system extracts a set of video features representing properties of a video segment. More specifically, the system can extract features representative of the visual complexity, motion, content, and/or any other characteristic of the input video based on a number of visual complexity, motion, and/or content specific metrics and/or models. Thus, the system can generate a video-level feature vector that acts as a representation of the input video. The system can then input this representation of the input video into the convex hull estimation model in order to estimate a set of bitrate-resolution pairs that are estimated to maximize the quality of the input video at each given bitrate without performing any trial encodes of the input video.

In order to generate a set of visual complexity features for the video-level feature vector of the input video, the system: calculates a visual complexity metric (e.g., Shannon entropy or peak signal-to-noise ratio) for each frame in the sequence of frames; and calculates a central tendency statistic (e.g., mean, harmonic mean, median) and/or a variance measure of this visual complexity metric to generate a visual complexity feature in a video-level feature vector. The system can execute these steps for each of a set of visual complexity metrics to obtain multiple visual complexity features in the video-level feature vector.

In another implementation, the system can also extract a set of motion features for inclusion in the video-level feature vector. The system can: calculate a set of motion metrics characterizing the motion in consecutive (or adjacent) frames of the sequence of frames; and calculate a central tendency statistic and/or a variance measure of this motion metric to generate a motion feature in the video-level feature vector. Alternatively, the system can extract motion features directly from the input video (e.g., without sampling specific frames of the video). Thus, upon calculating a set of motion metrics for each consecutive set of frames in the sequence of frames, the system can merge these motion metrics into a set of motion features representative of the input video.

The system can also calculate a set of content features for inclusion in the video-level feature vector. In one implementation, the system can: separately classify each frame in the sampled sequence of frames into a predetermined set of content categories (e.g., sports, games, news). Thus, the system can then generate a content classification for each frame in the sampled sequence of frames. Alternatively, the system can input each frame of the sampled sequence of frames into a visual feature model such as a convolutional neural network for image classification (hereinafter "image classification model") such as a convolutional neural network characterized by the INCEPTION architecture (i.e. a neural network architecture characterized by multiple convolution filters operating at the same layer of the network). The system can utilize the image classification model to generate a frame-level feature vector for each frame, wherein each frame-level feature vector represents the classifiable visual features of the frame. In one example, the system extracts an intermediate layer activation (e.g., a layer immediately prior to the classification layer) from the image classification model as the frame-level feature vector for each frame. Thus, the system can extract a set of content features with more context regarding the content of the image than a singular classification of each frame.

Once the system obtains a set of frame-level content features (i.e. a single classification or a vector of frame-level features) for each frame in the sampling sequence of frames, the system can then merge the frame-level content features for each frame into a set of content features in the video-level feature vector, wherein these content features represent the content of the entire sequence of frames and, therefore, the whole input video. For example, the system can execute principal component analysis or any other dimensionality reduction technique on the set of frame-level feature vectors to obtain a set of content features for the sequence of frames.

The system can input the merged frame-level feature vectors into a taxonomic video classification model, such as a taxonomic video classification model trained on the YT8M dataset, to obtain a set of content features representative of the input video. In one example, the system can extract the set of content features from an intermediate layer (e.g., a layer immediately prior to the classification layer) of the taxonomic video classification model.

Thus, the system can extract a video-level feature vector for the input video including a set of visual complexity features, a set of motion features, and a set of content features. In particular, the system can extract a set of video features representing properties of the video segment based on the sequence of frames, the set of video features including a set of motion features, a set of visual complexity features, and a set of content features in Block S112. More specifically, the system can: calculate the set of motion features based on consecutive frames in the sequence of frames; for each frame in the sequence of frames, calculate a set of frame-level visual complexity features for the frame; merge the set of frame-level visual complexity features into the set of video-level visual complexity features; execute a video classification model on the sequence of frames; and extract an intermediate layer activation of the video classification model, to generate the set of content features.

5. Convex Hull Estimation

The system can estimate a convex hull of an input video that includes a set of bitrate-resolution pairs, wherein each bitrate-resolution pair defines the highest quality resolution at a given bitrate according to a particular quality metric and when viewed in a particular viewing condition. Alternatively, the system can estimate a convex hull according to a quality metric that is agnostic to the viewing condition of the video, such as peak signal-to-noise ratio (PSNR), structural similarity index (SSIM), and video multimethod assessment fusion for 1080p (VMAF1080p). Thus, each resolution in a bitrate-resolution pair including the convex hull is the "quality-maximizing" resolution for that bitrate given the unique characteristics of that video. Consequently, for a given bitrate, encoding the input video at a lower resolution may increase blur in the input video relative to the resolution included in the convex hull of the input video, and encoding the video at a higher resolution may increase the prevalence of encoding artifacts in the input video relative to the resolution included in the convex hull of the input video. Depending on the unique aspects of a particular input video, the shape of the convex hull for this input video (i.e. the values of the bitrate-resolution pairs in the convex hull) may differ. For example, a convex hull of a first input video may indicate that the quality maximizing resolution given a bitrate of one megabit-per-second is 720p, while a convex hull of a second input video may indicate that the quality maximizing resolution given the same bitrate is 1080p. Typically, the convex hull of an input video may be calculated using a "brute force" process that includes: executing a series of trial encodings of the input video at various bitrates and resolutions; evaluating the viewing quality of each of these encodings (e.g., according to a quality metric); and identifying the highest quality resolution for each trial bitrate. However, this process is expensive in processor time and storage requirements. Instead, the system can estimate the convex hull of an input video without performing any trial encodes of the input video, thereby reducing the expense of calculating the convex hull for an input video.

In Block S120, the system inputs the video-level feature vector extracted from the input video into a convex hull estimation model, such as a long short-term memory recurrent artificial neural network (hereinafter "LSTM"), to estimate a set of bitrate-resolution pairs that define an estimated convex hull for the input video. More specifically, the system can generate a set of bitrate-resolution pairs based on the set of video-level features via a convex hull estimation model, each bitrate-resolution pair in the set of bitrate-resolution pairs defining a bitrate and defining a resolution estimated to maximize a quality score characterizing the video segment encoded at the bitrate of the bitrate-resolution pair. Thus, the system can generate a convex hull describing the relationship between resolution and quality over a range of bitrates specific to a particular input video within the evaluation time of an artificial neural network (e.g., 500 milliseconds) or other machine learning model instead of executing a series of trail encodings of the input video.

In one implementation, the system can generate an estimated convex hull for an input video via the convex hull estimation model, wherein the estimated convex hull also predicts an estimated quality (according to a quality metric) of the input video when encoded according to each bitrate-resolution pair. For example, the system can generate an estimated convex hull for an input video that specifies that the quality maximizing resolution for the input video at one megabit-per-second is estimated to be 720p and the quality of the input video when encoded at the bitrate of one megabit-per-second and at the resolution of 720p is estimated to be a quality score of 85, as measured by VMAF. Therefore, by also estimating the quality of the input video at each bitrate-resolution pair in the estimated convex hull, the system can more effectively select, for the video-specific encoding ladder of the input video, bitrate-resolution pairs from the estimated convex hull of an input video that result in the largest improvements in viewing quality for a given audience of the input video.

However, in order to ensure that the convex hull estimation model outputs an accurate convex hull (e.g., a convex hull that actually represents the quality maximizing resolution for the input video over a series of bitrates), the system or another computer system in cooperation with the system, can train the convex hull estimation model according to the process described below.

The system can also execute multiple convex hull estimation models, wherein each convex hull estimation model outputs estimated convex hulls that indicate quality-maximizing resolutions for the input video when encoded over a range of bitrates and viewed in a particular viewing condition. For example, the system can train a separate convex hull estimation model for a 4 K television viewing condition, a 1080p television viewing condition, for a mobile viewing condition, and/or for a laptop viewing condition. Therefore, when executing subsequent Blocks of the method S100, the system can access audience viewing condition data and better select bitrate-resolution pairs for a video-specific encoding ladder of the input video that improve the viewing quality for the most viewers across multiple different viewing conditions.

5.1 Training

The system (or a related training system coordinating with the system) can train the convex hull estimation model (e.g., a machine learning model such as an LSTM) based on a corpus of training examples according to a training process. More specifically, the system can: access a set of training video segments. Then, for each training video segment in the set of training video segments, the system can: extract a set of training video features representing properties of the training video segment; generate a training feature vector for the training video segment based on the set of training video features; encode a set of trial encodes of the training video segment; calculate a quality score of each trial encode in the set of trial encodes according to a quality metric to generate a set of quality scores; identify a convex hull of the training video segment based on the set of trial encodes and the set of quality scores of the set of trial encodes, the convex hull including a subset of trial encodes in the set of trial encodes that are characterized by a maximum quality score at each encoding bitrate in the set of trial encodes; and generate a training example including the training feature vector and the convex hull of the training video segment. The system can then: compile each training example into a set of training examples; and train the convex hull estimation model based on the set of training examples.

Thus, in order to train the convex hull estimation model, the system can access a set of training videos; identify the convex hull of each training video according to a quality metric; extract a set of video-level features for each training video thereby generating a corpus of training examples, wherein each training example includes a set of video level features and a convex hull of a training video; and execute a supervised learning algorithm utilizing the corpus of training examples and the convex hull estimation model.

However, the system can apply other learning algorithms to the convex hull estimation model in order to provide accurate and computationally inexpensive estimates of the convex hull of an input video such as unsupervised, adversarial, and/or reinforcement learning algorithms.

5.1.1 Datasets

Generally, when accessing a set of training videos, the system can access a set of training videos that are representative of desired input videos. Users of the system may curate a specific set of training videos to effectively bias or improve the convex hull estimation of the convex hull estimation model for a specific category of input video. Thus, the system can train separate convex hull estimation models, wherein each convex hull estimation model is based on a specific curated set of training videos. For example, the system can train a convex hull estimation model for sports videos by accessing a set of sports-related training videos. Additionally, the system can evaluate the set of training videos against additional (e.g., multiple) sets of quality metrics such that the system can train separate convex hull estimation models for different use cases where different quality metrics may be more relevant (i.e. mobile device viewing versus television screen viewing). Furthermore, the system can evaluate the set of training videos according to quality metrics optimized for different viewing conditions in order to train a convex hull estimation model for each supported viewing condition in a set of supported viewing conditions.

5.1.2 Convex Hull Identification

Figure 4:
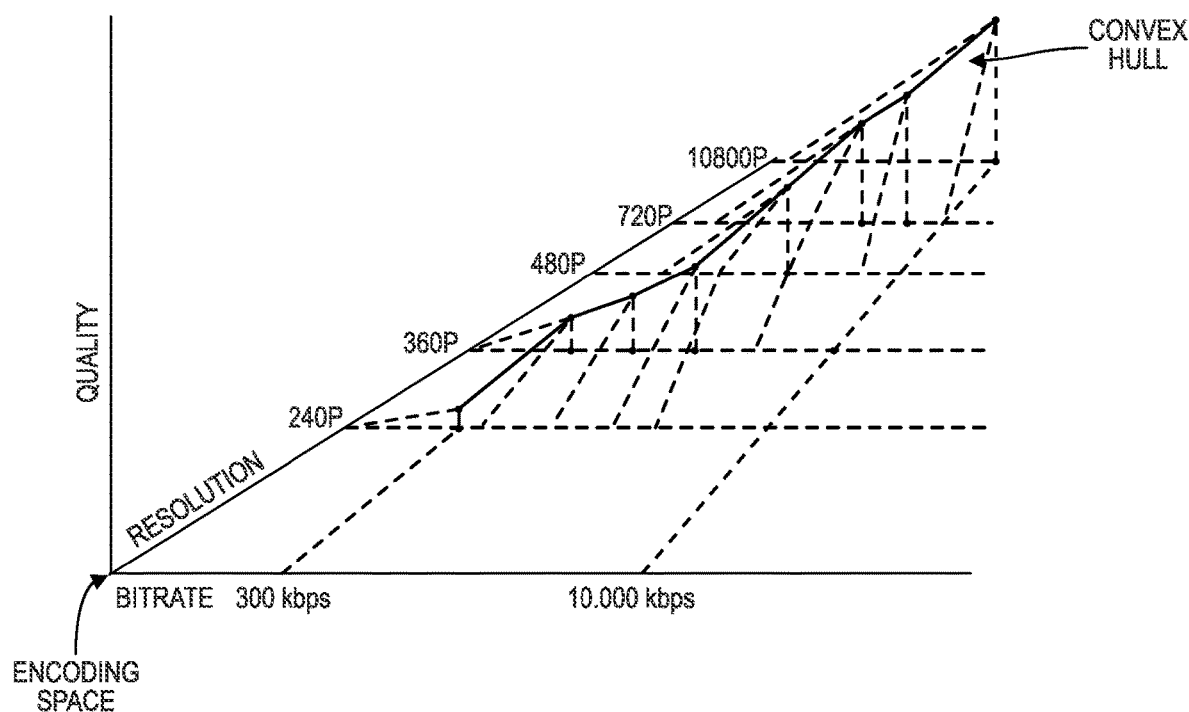
FIG. 4 is a conceptual representation of a quality-bitrate-resolution graph.

Upon accessing the set of training videos, the system can calculate the convex hull, as shown in FIG. 4, for each of the set of training videos according to a quality metric, such as via a series of trial encodings in a trial encoding process. When calculating the convex hull for each training video the system can calculate the convex hull according to any quality metric or a consensus of multiple quality metrics, such as mean square error (MSE), PSNR, SSIM, Multiscale SSIM (MS-SSIM), or video multimethod assessment fusion (VMAF). The system can calculate the quality metric according to a subset of frames from a rendition of a training video. In one example, the system evaluates the quality metric for each frame of the rendition of the training video. In another example, the system evaluates the quality metric for sample sequence of frames from the training video. The system can then calculate a central tendency statistic, such as the mean, geometric mean, or harmonic mean, to calculate a value indicating to overall quality of the rendition of the training video. Additionally or alternatively, the system can remove outliers and/or otherwise precondition the distribution of quality values across frames of the rendition of the training video before calculating a value of the quality metric for the rendition of the training video.

To initiate calculation of a convex hull of a training video, the system can encode an initial rendition of the training video at a low bitrate as a first step in the trial encoding process (e.g., 200 kbps and 180p). The system can then evaluate the quality of the rendition according to the quality metric. Subsequently, the system can increase the bitrate and/or resolution and again evaluate the rendition according to the quality metric. The system can repeat this process until the system evaluates a rendition with a quality metric higher than threshold quality (e.g., a VMAF score of 90).

Alternatively, to initiate calculation of a convex hull of a training video, the system can encode an initial rendition of the training video at a high bitrate and a high resolution as a first step in the trial encoding process. For example, the system can encode an initial rendition at a bitrate greater than 99% of internet streaming viewers or a highest supported bitrate of the system (e.g., 8,000 kbps, 14,000 kbps). Correspondingly, the system can encode the initial rendition at a highest supported resolution such as 4 K or 1080p resolution. Once the system has encoded the initial rendition of the training video, the system calculates the quality of the rendition according to a predetermined quality metric or consensus of quality metrics.

Upon evaluating the quality of the initial rendition according to the chosen quality metric and storing the quality of the initial rendition, the system selects a bitrate for second and third trial renditions. The bitrate of the second and third trial renditions can be selected as a percentage decrement of the maximum bitrate or as a predetermined or adjustable bitrate decrement. Once the system has selected a bitrate for the second trial rendition and third trial renditions, the system can encode the second rendition at the maximum supported resolution and at the selected bitrate and can also encode the third trial rendition at the selected bitrate and at a first resolution below the maximum supported resolution in a supported set of discrete resolutions. For example, if the system encodes at a maximum supported resolution of 4 K and a second highest supported resolution of the system is 1080p the system can encode the second rendition at the decremented bitrate and 4 K resolution and the third resolution at the decremented bitrate and 1080p resolution. After encoding the second and third renditions of the training video, the system can then calculate a quality metric for each of the second rendition and the third rendition and can select the quality-maximizing resolution for inclusion in the convex hull of the training video at the selected bitrate. The system can continue decrementing the selected bitrate for encoding trial renditions or stepping down a predetermined bitrate ladder to test adjacent discrete resolutions over a range of bitrates (e.g., from 10,000 kbps to 250 kbps). In one implementation, the system encodes renditions of the training video at bitrates corresponding to a predetermined bitrate ladder (e.g., a 54-bitrate ladder) and selects the quality-maximizing resolution for inclusion in the convex hull of the training video at each bitrate in the predetermined bitrate ladder. Additionally or alternatively, the system can interpolate between data points in the convex hull of the training video to fully characterize the encoding space of the training video. Furthermore, the system can execute a search algorithm (e.g., binary search) to calculate a more precise bitrate (e.g., bitrates between the bitrates of the predetermined bitrate ladder) at which the quality-maximizing resolution transitions between adjacent discrete resolutions.

In one implementation, the system can store the quality metric calculated for each rendition of the training video that is identified as being part of the convex hull of the training video. Thus, in this implementation, the system can train the convex hull estimation model to additionally estimate the quality of each bitrate-resolution pair in an estimated convex hull of an input video.

In another implementation, the system can perform multiple iterations of this convex hull identification process for each of a set of viewing conditions by changing (for each iteration of the convex hull identification process) the quality metrics calculated for each rendition of the training videos to a quality metric that specifically characterizes the quality of the rendition for a particular viewing condition in the set of viewing conditions. Thus, the system can train separate convex hull estimation models for each viewing condition in a predetermined set of viewing conditions by training each model on a set of training examples particular to each viewing condition.

The system can also calculate the convex hull of a training video via trial encodings according to any other algorithm in order to sufficiently characterize the encoding space for the training video.

To complete a training example based on a training video from the set of training videos, the system can extract a set of video-level features from the training video according to the above described feature extraction process. Once the system extracts a vector of video-level features from the training video, the system has generated a training example including an example input (the video-level features) and an example output (the convex hull including a set of quality-maximizing bitrate-resolution pairs). Therefore, the system can generate a corpus of training examples for the convex hull estimation model by executing the above described steps across a set of training videos. Once the system has generated a corpus of training examples, the system can execute a back-propagation algorithm or other supervised learning algorithm to train the convex hull estimation model according to the corpus of training examples.

5.2 Convex Hull Estimation Model

Once the system has trained a convex hull estimation model (or a set of convex hull estimation models) according to the aforementioned training process, the system can access the trained version of the convex hull estimation model while executing Block S120 in order to estimate a set of bitrate-resolution pairs approximating the quality-maximizing convex hull of an input video without performing the aforementioned trial encoding process to fully characterize the encoding space of the input video. More specifically, the system can: generate a feature vector for the video segment based on the set of video features; and execute the convex hull estimation model (e.g., an artificial neural network) on the feature vector to generate a set of quality-maximizing bitrate-resolution pairs.

Thus, the system executes the convex hull estimation model on a set of video-level features for an input video and the convex hull estimation model outputs, substantially in real time (e.g., within 500 ms), an estimate of the convex hull of the input video in the form of a set of bitrate-resolution pairs. Each bitrate-resolution pair of the estimated convex hull for the input video estimates the quality-maximizing resolution corresponding to a particular bitrate of the bitrate-resolution pair.

In one implementation, the system evaluates a convex hull estimation model on an input video that outputs a set of 54 bitrate-resolution pairs that span an encoding space between 10,000 kbps and 250 kbps, as the convex hull of the input video. However, the system can evaluate a convex hull estimation model that outputs any number of bitrate-resolution pairs over any range of bitrates. Furthermore, the system can evaluate a convex hull estimation model that outputs an adaptable number of bitrate-resolution pairs across an adaptable range, wherein both the number of bitrates and the range of bitrates are dependent on the video-level feature vector of the input video.

In another implementation, the system can evaluate the convex hull estimation model on an input video to output a set of bitrate-resolution pairs and predict, for each bitrate-resolution pair, the quality score of the input video encoded according to the bitrate resolution pair. More specifically, the system can: generate a set of bitrate-resolution pairs based on a set of video features of the input video via the convex hull estimation model, each bitrate-resolution pair in the set of bitrate-resolution pairs: defining a bitrate; defining a resolution estimated to maximize a quality score characterizing the video segment encoded at the bitrate; and defining the quality score of a rendition of the video segment corresponding to the bitrate-resolution pair. Thus, the system can leverage the predicted quality score corresponding to each bitrate-resolution pair to inform the bitrate-resolution pair selection process described in further detail below in order to select a subset of the bitrate-resolution pairs for the video-specific encoding ladder that most improve the aggregate quality of the input video when viewed by the predicted audience of the video.

In another implementation, the system can evaluate a set of convex hull estimation models for each viewing condition in a predicted set of audience viewing conditions. More specifically, the system can: for each viewing condition in a set of viewing conditions, generate a viewing-condition-specific set of bitrate-resolution pairs based on the set of video features via a convex hull estimation model corresponding to the viewing condition; compile each viewing-condition specific set of bitrate-resolution pairs into the set of bitrate-resolution pairs; for each viewing condition in the set of viewing conditions, access a viewing-condition-specific distribution of audience bandwidths representative of likely viewers of the video segment satisfying the viewing condition; compile each viewing-condition-specific distribution of audience bandwidths into a set of distributions of audience bandwidths; and append successive bitrate-resolution pairs in the set of bitrate resolution pairs to the encoding ladder for the video segment based on a marginal quality-per-cost score of each bitrate-resolution pair in the set of bitrate-resolution pairs, the marginal quality-per-cost score based on the set of distributions of audience bandwidths and the current set of bitrate-resolution pairs in the encoding ladder. Thus, instead of selecting bitrate-resolution pairs for the video-specific encoding ladder for the input video from a single estimated convex hull of the input video, the system can select bitrate-resolution pairs from any of the estimated convex hulls corresponding to the various viewing conditions in the predicted audience of the input video. Therefore, based on the predicted audience distribution across these viewing conditions and the predicted and/or representative bandwidth distribution of the audience satisfying each viewing condition, the system can better select bitrate-resolution pairs that maximize quality for the particular audience of the input video.

6. Audience Data Access

Generally, as shown in FIGS. 1, 2, and 3, the system can access a distribution of audience bandwidths representative of likely viewers of the video segment in Block S130. More specifically, the system can: access historical audience data for a set of similar videos and/or currently available audience data for the input video itself and predict a distribution of audience bandwidths representing likely viewers of the input video. Thus, the system can estimate the effect of each bitrate-resolution pair included in the estimated convex hull of the input video on the aggregate viewing quality for viewers of the input video by multiplying the quality score corresponding to each bitrate-resolution pair by the number of viewers in a segment of the distribution of audience bandwidths that are predicted to view the bitrate-resolution pair.

In order to access an audience bandwidth distribution that is representative of an audience of the input video, the system, or another system cooperating with the system, can record the bandwidth of each viewer of historical videos streamed by the system. More specifically, for each viewer of a previous internet video stream, the system can record the bandwidth of the viewer's connection with the streaming server for the duration of the viewer's viewing time of the internet stream and average this bandwidth to obtain one value representing the viewers average bandwidth for the stream.

Before selecting a set of bitrate-resolution pairs for the video-specific encoding ladder of the input video, the system accesses a set of audience data in the form of a distribution of audience bandwidths and resolutions from a set of videos representing the input video. In one implementation, the system retrieves audience data of similar length, similar content classification, and similar video-level features. Alternatively, the system can retrieve audience data from videos published by the same publisher of the input video. The system retrieves viewing data that can include a set of audience bandwidths, resolutions, and/or viewing conditions. For example, an individual data point in the audience data can include a single audience member's viewing bitrate and conditions such as 1400 kbps at 720p on a mobile device. In one implementation, the system can retrieve a compressed representation of the audience data such as a set of distributions of audience bandwidths, each distribution corresponding to a particular viewing condition in a set of viewing conditions. Additionally or alternatively, the system can retrieve a single distribution representing the audience bandwidths at all viewing conditions.

Once the system has recorded bandwidth data for a set of previous internet streams, the system can calculate a weighted average distribution for the input video based on audience bandwidth distribution for a selected set of previous videos. In one implementation, the system can select similar videos to the input video based on the publisher of the input video. For example, the system can select previous videos from the same publisher and calculate the weighted average distribution from the audience data of these videos. In another example, the system can: generate a video-level feature vector for the set of historical videos; calculate a similarity index between the input video and each historical video in the set of historical videos; select a subset of the historical videos, in response to the similarity index of each historical video in the subset of historical videos exceeding a threshold similarity index; and calculate a weighted average distribution based on audience bandwidth distributions of the selected subset of historical videos. However, the system can identify a set of similar videos to the input video and calculate a weighted average audience bandwidth distribution based on this set of similar videos in any other way.

In one implementation, the system can also estimate, based on device audience data from historical internet stream of historical video, the viewing condition of each viewer of these historical videos, and record multiple audience bandwidth distributions for each historical video corresponding to each viewing condition. Thus, the system can access an audience bandwidth distribution for each viewing condition supported by the system and better estimate changes in viewing quality over multiple viewing conditions when accounting for the likely viewers of the input video. Alternatively, the system can access a separate audience viewing condition distribution indicating the proportion of viewers estimated to satisfy each viewing condition.

In another implementation, the system can also record and/or access historical geographic viewer data in order to estimate an audience geographic distribution for the input video. Thus the system can better predict the distribution costs of the input video based on the predicted locations of viewers of the input video.

7. Top Rendition Selection

In one variation, in Block S140, the system selects a top bitrate-resolution pair (i.e. highest bitrate-resolution pair, maximum bitrate-resolution pair) for the video-specific encoding ladder from the set of bitrate-resolution pairs (e.g., a highest quality rendition of the video for the video-specific encoding ladder). More specifically, the system selects a top bitrate-resolution pair from the estimated convex hull of an input video that, when the input video is encoded according to the top bitrate-resolution pair, the quality of that rendition is greater than a threshold quality within a confidence interval.

In order to estimate the top bitrate-resolution pair for the video-specific encoding ladder in the convex hull of the input video, the system (or a related system coordinating with the system) can train a machine learning model (e.g., a boosted tree model) that takes in a convex hull estimate for an input video and outputs a top bitrate-resolution pair (hereinafter the "top rendition model"). The top rendition model can be trained on the same or similar set of training videos as the convex hull estimation model, however, when preparing a corpus of training examples for the top rendition model, the system can further calculate a top bitrate-resolution pair in the fully characterized encoding space of the training video. The system can calculate the top bitrate-resolution pair based on conditional logic, such as by calculating the partial derivative of bitrate with respect to quality of the convex hull of the training video and identifying a bitrate at which the derivative falls below a threshold value. Alternatively, the system can select a lowest bitrate on the convex hull of the training video that corresponds to a quality above a threshold quality. The system can therefore train the top rendition model according to a supervised learning algorithm based on a set of training examples, wherein each training example includes the convex hull of a training video calculated according to the trial encoding process (as an input) and a top bitrate for the same training video (as an output).

Alternatively, the system can select the top bitrate-resolution pair from the set of bitrate-resolution pairs directly via conditional logic. In implementations in which the convex hull estimation model outputs a quality score for each bitrate-resolution pair in the estimated convex hull of the input video, the system can: identify, in the set of bitrate-resolution pairs, a set of high-quality bitrate-resolution pairs characterized by quality scores greater than a threshold quality score; and select the top bitrate-resolution pair from the set of high-quality bitrate-resolution pairs, the top bitrate-resolution pair defining the top bitrate equal to a minimum bitrate from the set of high-quality bitrate resolution pairs. Thus, the system selects the bitrate-resolution pair characterized by the lowest bitrate that is also characterized by greater than a threshold quality score. For example, the system can select the top bitrate-resolution pair as the lowest bitrate-resolution pair with an estimated quality score greater than VMAF 94.

In another implementation, the system can select a top bitrate-resolution pair by identifying the point along the estimated convex hull of an input video in which the quality of the rendition does not substantially increase with an increase in bitrate (i.e. there are diminishing returns in quality for increases in bitrate). For example, the system can select a bitrate-resolution pair in the set of bitrate-resolution pairs at which the derivative of quality with respect to bitrate is less than a threshold for the particular input video. Thus, the system selects the top bitrate-resolution pair in the video-specific encoding ladder for the video in order to constrain the encoding space for the input video to bitrates that provide meaningful differences in video quality.

Additionally or alternatively, the system can access audience data for the training video and select a top bitrate-resolution pair consistent with a predetermined percentile (e.g., 99%) of audience bandwidths for the training video. Furthermore, the system can select a top bitrate-resolution pair that is the higher or lower result of the aforementioned calculation methods. Furthermore, the system can select a different top bitrate based on the intended audience of the input video and audience data corresponding to the intended audience. For example, the system can select a top bitrate corresponding to a VMAF score of 88 for Canadian users while selecting a top bitrate corresponding to a VMAF score of 93 for Mexican users. Therefore, the system can train separate top bitrate models for each potential audience segment of an input video.

Upon accessing a trained version of the top rendition model the system can evaluate the top rendition model with the estimated convex hull of the input video as input to the top rendition model to estimate a top bitrate-resolution pair for the input video. Once the system estimates a top bitrate-resolution pair for the input video the system can remove (e.g., from consideration for the video-specific encoding ladder for the video) bitrate-resolution pairs in the estimated convex hull of the input video characterized by bitrates above the estimated top bitrate-resolution pair of the input video.

8. Bottom Rendition Selection

In addition to selecting a top bitrate-resolution pair for an input video (i.e. a top rendition for the video-specific encoding ladder for the input video), in one variation, the computer system can also select a bottom bitrate-resolution pair (i.e. a lowest bitrate-resolution pair, a minimum bitrate-resolution pair) representing a lowest quality rendition of the video in the video-specific encoding ladder for an input video in Block S150. More specifically, the system can select a bottom bitrate-resolution pair for the video-specific encoding ladder from the set of bitrate-resolution pairs, the bottom bitrate-resolution pair defining a bottom bitrate in the encoding ladder for the input video, wherein each additional bitrate-resolution pair included in the encoding ladder is characterized by a bitrate greater than the bottom bitrate.

In one implementation, the system can train and evaluate a bottom rendition model based on the same or similar set of training videos as the convex hull estimation model and/or the top rendition model. However, when preparing a set of training examples for the bottom rendition model, the system can calculate, from the fully characterized encoding space of the training video, a bottom bitrate-resolution pair for the training video. Additionally or alternatively, the system can access audience data for the training video and select a bottom bitrate consistent with a predetermined percentile (e.g., 1%) of audience bandwidths for the training video. As described above, the system can also train separate bottom rendition models based on different minimum acceptable qualities according to variations in the preferences of various audience segments. Furthermore, the system can select a bottom bitrate that is the higher or lower result of the aforementioned calculation methods. The system can identify a lowest bitrate-resolution pair, along the convex hull of the training video, at which the quality of the encoded training video at the bitrates is greater than or equal to a minimum threshold quality for the video as the bottom bitrate of the training video.

The system can then train the bottom rendition model according to a supervised learning algorithm based on a set of training examples, wherein each training example includes the convex hull of a training video calculated according to the trial encoding process (as an input) and a bottom bitrate-resolution pair for the same training video (as an output).

In implementations in which the convex hull estimation model also estimates a quality score for each bitrate-resolution pair in the estimated convex hull of the input video, the system can execute conditional logic based on the estimated quality score of each bitrate-rendition pair to select the bottom bitrate-resolution pair for the video-specific encoding ladder of the input video. More specifically, the system can: identify a set of bitrate-resolution pairs characterized by a quality score greater than a threshold quality score; and select the bitrate-resolution pair in the identified set of bitrate-resolution pairs characterized by the lowest bitrate in the identified set of bitrate-resolution pairs.

In another implementation, based on the distribution of audience bandwidths corresponding to the input video, the system can: identify a threshold percentile in the distribution of audience bandwidths; and select a first bitrate-resolution pair defining a bitrate greater than the threshold percentile as the bottom bitrate-resolution pair. Thus, the system can ensure that a predetermined percentile of likely viewers of the input video will be able to stream the input video.

However, the system can select a bottom bitrate-resolution pair from the estimated convex hull of the input video for inclusion in the video-specific encoding ladder of the input video in any other way.

9. Video-Specific Encoding Ladder Selection

Generally, in Block S160, the system can select an encoding ladder for the input video, including a subset of bitrate-resolution pairs in the set of bitrate resolutions pairs estimated to predicted to yield an aggregate quality score near a maximum possible quality score for the video segment based on the distribution of audience bandwidths. More specifically, in Block S160 the system can select a particular subset of bitrate-resolution pairs—in the set of bitrate-resolution pairs—for the video-specific encoding ladder based on the distribution of audience bandwidths. Thus, the system can select a set of bitrate-resolution pairs (characterized by bitrates between the selected top bitrate and bottom bitrate of the input video) for inclusion in the video-specific encoding ladder for the input video based on audience data for videos related to the input video.

The system can select a subset of bitrate-resolution pairs from the set of bitrate-resolution pairs between the top rendition and the bottom rendition along the estimated convex hull of the input video, according to a user-defined setting (e.g., the system can offer video-specific encoding ladders with any number of renditions between 3 and 20 renditions). Alternatively, the system can estimate a number of renditions included in the video-specific encoding ladder from the estimated convex hull of the input video based on audience bandwidth data and/or audience viewing condition data.

Thus, in implementations in which the system selects a bottom bitrate-resolution pair and a top bitrate-resolution pair, the system can: select the subset of bitrate-resolution pairs in the set of bitrate-resolution pairs based on the distribution of audience bandwidths, the subset of bitrate-resolution pairs defining bitrates less than the top bitrate, and/or select the subset of bitrate-resolution pairs in the set of bitrate-resolution pairs based on the distribution of audience bandwidths, the subset of bitrate-resolution pairs defining bitrates greater than the bottom bitrate.

In Block S160, the system selects a video-specific encoding ladder for the input video including a subset of bitrate-resolution pairs (i.e. renditions) in the set of bitrate-resolution pairs estimated to maximize viewing quality over the distribution of audience bandwidths. More specifically, the system can select renditions of the video that the system estimates provide highest video quality for the largest number of audience members given each audience member's viewing bitrate according to the retrieved audience data. Because each bitrate-resolution pair included in the convex hull includes the estimated highest quality resolution for a given bitrate, any audience member that is viewing the input video at bandwidth equal to a bitrate of a rendition included in the video-specific encoding ladder is viewing the highest quality rendition for their bitrate. However, as an audience member's viewing bitrate increases from the bitrate of the rendition before reaching an adjacent rendition in the video-specific encoding ladder, the difference between the quality of the rendition and the highest possible quality given the increased bandwidth of the audience member increases. Thus, the system can select renditions for the video-specific encoding ladder of the input video, in order to minimize the difference between audience bandwidths in the distribution of audience bandwidths and the bitrates corresponding to selected renditions in the video-specific encoding ladder of the application.

Alternatively, the system can minimize a function of the difference between the audience bandwidths in the distribution of audience bandwidths and the bitrates of the selected renditions of the video-specific encoding ladders. In this implementation, the system can utilize a function describing quality as function of bitrate, wherein the function is based on an average fit of calculated convex hulls for a set of training videos. Thus, the system can select a subset of renditions from the estimated convex hull of the input video that minimizes the difference between audience bandwidths in a distribution of audience bandwidths and bitrates of the nearest rendition in the video-specific encoding ladder with a bitrate less than the audience bandwidths.

In one variation, the system can execute an iterative selection process by repeatedly selecting individual bitrate-resolution pairs from the set of bitrate-resolution pairs for the video-specific encoding ladder, based on a marginal quality-per-cost score of each bitrate-resolution pair in the set of bitrate-resolution pairs and based on the bitrate-resolution pairs already included in the video-specific encoding ladder. Thus, in each iteration of this iterative selection process, the system: scores each bitrate-resolution pair in the set of bitrate-resolution pairs of the estimated convex hull that have not yet been selected for inclusion in the video-specific encoding ladder based on the cost of generating, maintaining, and distributing a rendition of the input video corresponding to each bitrate-resolution pair and the resulting improvement in quality for a predicted distribution of audience bandwidths given the set of bitrate-resolution pairs already included in the video-specific encoding ladder of the input video. Therefore, during each iteration, the system selects the bitrate-resolution pair in the set of bitrate-resolution pairs that most improves the quality of the input video across the predicted set of viewers of the input video when compared to the status quo encoding ladder. This process is described in further detail below.

In another variation, the system can execute Block S160 and select a video-specific encoding ladder for the input video for each viewing condition or geographic region indicated by the representative audience data for the input video. Alternatively, the system can select particular renditions in a single video-specific encoding ladder that address particular sections of the audience bitrate distribution across viewing conditions or for particular geographic regions. Therefore, the steps described below with respect to Block S160 can be executed once or multiple times for the same input video. Thus, the system can evaluate the relative costs of selecting additional bitrate-resolution pairs for a single encoding ladder or generating a second encoding ladder specific to a separate viewing condition.

9.1 Iterative Bitrate-Resolution Pair Selection

Generally, as shown in FIG. 3, the system can select successive bitrate-resolution pairs via an iterative selection process in Block S180. More specifically, the system can append successive bitrate-resolution pairs in the set of bitrate resolution pairs to an encoding ladder for the video segment based on a marginal quality-per-cost score of each bitrate-resolution pair in the set of bitrate-resolution pairs (calculated based on a predicted quality score of the bitrate-resolution pair), the marginal quality-per-cost score based on the distribution of audience bandwidths, and a current set of bitrate-resolution pairs included in the video-specific encoding ladder. Additionally, the system can recalculate the marginal quality-per-cost score for each bitrate-resolution pair in the set of bitrate resolution pairs during each iteration of this selection process to account for changes in a predicted aggregate viewing quality of the current video-specific encoding ladder prior to selecting an additional bitrate-resolution pair for the video-specific encoding ladder. During each iteration of the iterative selection process, the system can also compare the set of marginal quality-per-cost scores of the set of bitrate-resolution pairs to a threshold marginal quality-per-cost score and, in response to a marginal quality-per-cost score in the set of marginal quality-per-cost scores exceeding the threshold quality-per-cost score, append a bitrate-resolution pair characterized by a maximum quality-per-cost score to the video-specific encoding ladder for the input video.

In one example, the system can select an additional bitrate-resolution pair for inclusion in the video-specific encoding ladder in response to a quality improvement-per-cost of the rendition greater than a threshold. In another example, the system can select an additional bitrate-resolution pair for inclusion in the video-specific encoding ladder in response to a quality improvement that is predicted to result in a positive return-on-investment (e.g., a positive profit margin) when compared with the cost of producing a rendition of the input video according to the additional bitrate-resolution pair.

In order to calculate the marginal quality-per-cost score for each bitrate-resolution pair in the set of bitrate-resolution pairs, the system can: calculate a rendition cost of the bitrate-resolution pair, which accounts for the encoding cost, the storage cost, and/or the distribution cost of including the bitrate-resolution pair in the video-specific encoding ladder for the input video; calculate a marginal quality score, representing an aggregate improvement in the viewing quality over the predicted distribution of audience bandwidths (i.e. the audience bandwidth distribution) in response to the addition of the bitrate-resolution pair to the video-specific encoding ladder of the input video; and divide the marginal quality score by the rendition cost to obtain a marginal quality-per-cost score for the bitrate-resolution pair. More specifically, the system can, for each bitrate-resolution pair in the set of bitrate-resolution pairs: calculate a rendition cost of the bitrate-resolution pair, the rendition cost representing a cost of a rendition of the video segment corresponding to the bitrate-resolution pair in Block S182; calculate a marginal quality score of the bitrate-resolution pair based on the distribution of audience bandwidths and the current set of bitrate-resolution pairs in the encoding ladder, the marginal quality score representing an aggregate improvement in viewing quality according to the audience bandwidth distribution in response to an addition of the bitrate-resolution pair to the encoding ladder in Block S184; and calculate a marginal quality-per-cost score of the bitrate-resolution pair based on the marginal quality score of the bitrate-resolution-pair and the rendition cost of the bitrate-resolution pair in Block S186.

In one implementation, the system can execute a cost estimation function that estimates the cost of encoding, storing, and/or distributing a rendition of the input video encoded according to a bitrate-resolution pair based on audience data (e.g., audience bandwidth distribution, audience geographic distribution, audience viewing condition distribution) and based on the bitrate defined by the bitrate-resolution pair and the resolution defined by the bitrate-resolution pair. More specifically, the system can: calculate an encoding cost of a rendition corresponding to the bitrate-resolution pair; calculate a storage cost of the rendition corresponding to the bitrate-resolution pair; calculate a distribution cost of the rendition corresponding to the bitrate-resolution pair; and combine the encoding cost, the storage costs, and the distribution cost to calculate the rendition cost.

In another implementation, the system can calculate the marginal quality score of each remaining bitrate-resolution pair in the set of bitrate-resolution pairs by multiplying a predicted quality score (according to a particular quality metric) of the bitrate-resolution pair by a segment (e.g., proportion) of the audience bandwidth distribution of the input video that is characterized by a bandwidth sufficient to view a rendition of the input video encoded according to the bitrate and resolution of the bitrate-resolution pair and a bandwidth that is not large enough to view a higher bitrate rendition already present in the encoding ladder. The system can then subtract an aggregate quality score (calculated over the same region of the audience bandwidth distribution) for an adjacent lower rendition in the video-specific encoding ladder to determine a marginal aggregate quality score that represents an improvement in aggregate viewing quality caused by the addition of the bitrate-resolution pair to the video-specific encoding ladder. More specifically, the system can, for each bitrate-resolution pair in the set of bitrate-resolution pairs: identify a lower adjacent bitrate-resolution pair in the encoding ladder relative to the bitrate-resolution pair; identify a higher adjacent bitrate-resolution pair in the encoding ladder relative to the bitrate-resolution pair; calculate a first predicted quality score of the bitrate-resolution pair estimating a viewing quality of a first rendition of the video segment corresponding to the bitrate-resolution pair; integrate the first quality score by a bandwidth segment in the audience bandwidth distribution to generate an improved aggregate quality score, the bandwidth segment extending from a lower bandwidth defined by the bitrate-resolution pair to a higher bandwidth defined by the higher adjacent bitrate-resolution pair; calculate a second quality score of the lower adjacent bitrate-resolution pair estimating a viewing quality of a second rendition of the video segment corresponding to the lower adjacent bitrate-resolution pair; multiply the second quality score by the bandwidth segment in the audience bandwidth distribution to generate a status quo aggregate quality score; and subtract the status quo aggregate quality score from the improved aggregate quality score to calculate the marginal quality score of the bitrate-resolution pair. Thus, the system can precisely predict differences in aggregate viewing quality based on the estimated quality score (e.g., estimated by the convex hull estimation model) and the audience bandwidth distribution of the input video. In one example, the system can also multiply the predicted quality score of the bitrate-resolution pair by the bandwidth segment in multiple audience bandwidth distributions, wherein each audience bandwidth distribution represents a predicted audience characterized by a viewing condition in a set of viewing conditions. The system can then device the marginal quality score for each bitrate-resolution pair by the rendition cost of the bitrate-resolution pair to obtain a marginal quality-per-cost score for the bitrate-resolution pair.

Once the system has calculated a marginal quality-per-cost score, the system can evaluate whether the magnitude of any marginal quality-per-cost score of any bitrate-resolution pair justifies the inclusion of a successive bitrate-resolution pair in the video-specific encoding ladder in Block S188. More specifically, in response to a quality-per-cost score of at least one bitrate-resolution pair in the set of bitrate-resolution pairs exceeding a threshold quality-per-cost score, the system can: select a first successive bitrate-resolution pair in the set of bitrate-resolution pairs, the first successive bitrate resolution pair characterized by a maximum quality-per-cost score; remove the successive bitrate-resolution pair from the set of bitrate-resolution pairs; and append the successive bitrate-resolution pair to the encoding ladder. Thus, in each iteration of the iterative selection process, the system selects a bitrate-resolution pair for the video-specific encoding ladder that is characterized by the highest marginal quality-per-cost score greater than a threshold marginal quality-per-cost score. The system can: continue the iterative selection process until none of the marginal quality-per-cost scores characterizing the remaining bitrate-resolution pairs in the set of bitrate-resolution pairs exceed the threshold quality-per-cost score; and, in response to detecting this condition, publish the video-specific encoding ladder of the input video.

In one implementation, the system can iteratively select a bitrate-resolution pair from the set of bitrate-resolution pairs based on a predicted increase in profit (e.g., from providing the video streaming services for the input vide) resulting from the addition of the bitrate-resolution pair. More specifically, the system can calculate a profit score (e.g., as an alternative for the quality-per-cost score) for each bitrate-resolution pair in the set of bitrate-resolution pairs by: estimating an increase in revenue based on the marginal quality score of each bitrate-resolution pair; and subtracting the increase in revenue by the rendition cost of the bitrate-resolution pair. Thus, by scoring each bitrate-resolution pair based on the estimated increase in profit resulting from the addition of the bitrate-resolution pair to the video-specific encoding ladder, the system can evaluate whether adding each bitrate-resolution pair to the encoding ladder is monetarily valuable.

In order estimate the resulting revenue from the marginal improvement in aggregate viewing quality over the distribution of audience bandwidths, the system can train a profit estimation model to characterize the effects of increased viewing quality on viewing time for historical videos and apply this model to the characteristics of the input video and the increase in quality predicted by the marginal quality score of each bitrate-resolution pair. Alternatively, the system can execute a set of heuristics (e.g., a mathematical function) to estimate the increase in revenue from the marginal quality score of each bitrate-resolution pair. In this implementation, the system can set a threshold for selecting a bitrate-resolution pair based on the profit score of each bitrate resolution pair in the set of bitrate-resolution pairs at zero such that the system continues selecting profitable bitrate-resolution pairs for the encoding ladder until the cost of producing additional renditions of the input video exceeds any incremental profits.

10. Encoding Ladder Generation

Upon selecting a set of bitrate-resolution pairs for the video-specific encoding ladder of an input video, the system can generate an encoding ladder for the video segment including the top bitrate-resolution pair, the bottom bitrate-resolution pair, and/or the subset of bitrate-resolution pairs in Block S170. More specifically, the system can encode a set of renditions of the video segment, each rendition including an encoding of the video segment characterized by a bitrate and a resolution of a bitrate-resolution pair in the encoding ladder and publishing a manifest file representing the encoding ladder for an internet stream. In one example, the system can encode the input video using a video codec (e.g., H.264, H.265) and publish the encoding ladder as an HLS manifest file.

In one implementation, the system can record audience data for the input video and, after an initial time interval, the system can remove renditions from the video-specific encoding ladder (in order to improve performance and/or save server storage space), add renditions to the video-specific encoding ladder, and/or execute Blocks of the method S100 based on audience data for the input video itself instead of audience data for a representative set of other videos similar to the input video. Therefore, the system can periodically update the video-specific encoding ladder in response to changes in the audience data for the input video.

11. Method

Figure 5:
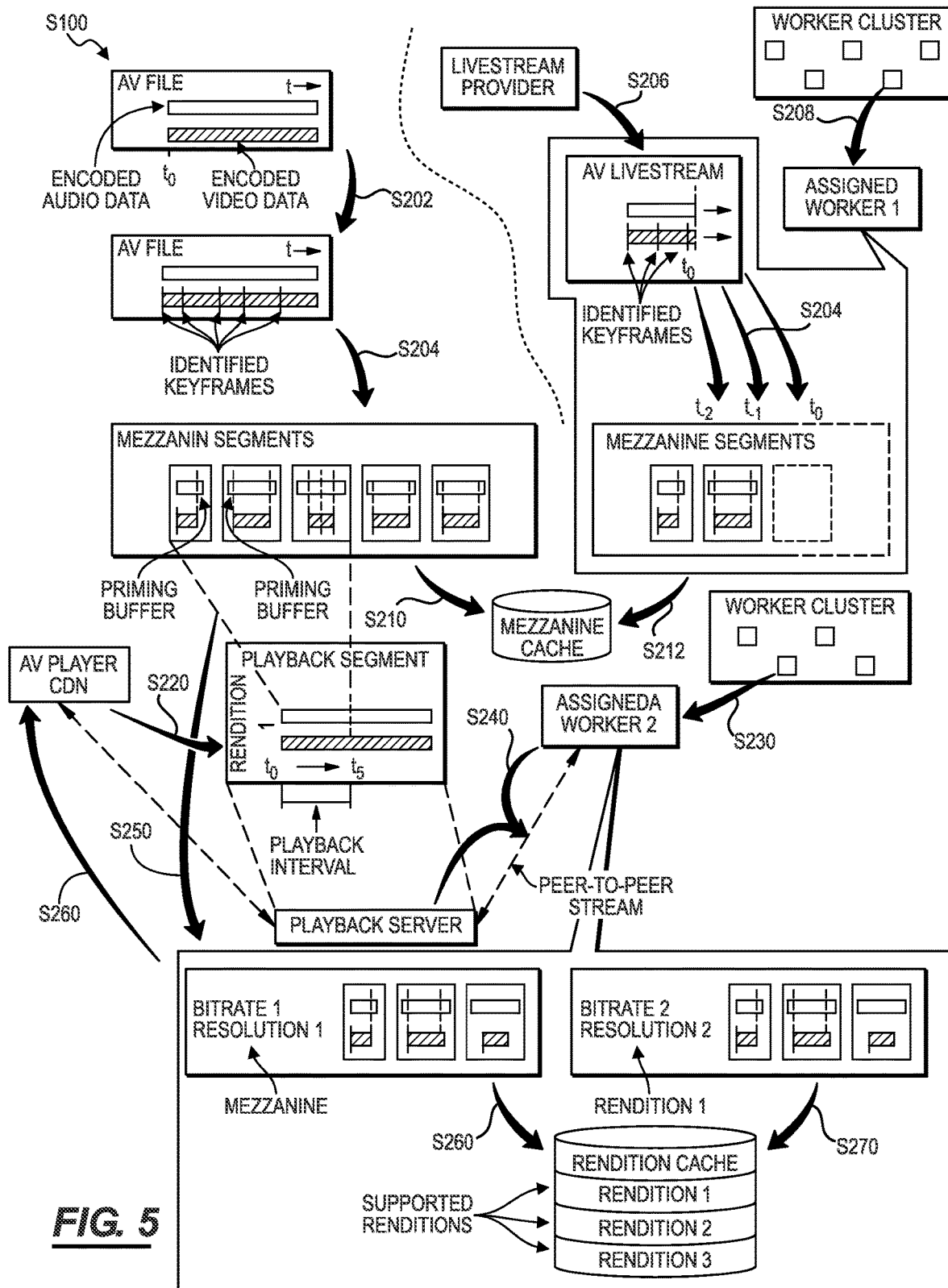
FIG. 5 is a flowchart representation of a method.

As shown in FIG. 5, a method S200 for streaming an audio-video file includes: storing a set of mezzanine segments of the audio-video file, each mezzanine segment in the set of mezzanine segments including a portion of the audio-video file beginning at an initial keyframe in the audio-video file and terminating at a terminal keyframe in the audio-video file in Block S210; receiving a first request for a first playback segment of the audio-video file in a first rendition from a first computational device, the first playback segment defining a first playback interval in the audio-video file in Block S220. The method S200 also includes, in response to identifying absence of the first playback segment in the first rendition from a rendition cache and identifying an absence of an assignment to transcode the first playback segment in the first rendition: assigning a first worker to transcode the first playback segment in the first rendition in Block S230; and initiating a first stream between the first worker and the first computational device in Block S240. The method S200 further includes, at the first worker: identifying a first consecutive subset of mezzanine segments in the set of mezzanine segments coinciding with the first playback interval in the audio-video file in Block S250. The method additionally includes, for each mezzanine segment in the consecutive subset of mezzanine segments: concurrently transcoding the mezzanine segment into a rendition segment in the first rendition and transmitting the rendition segment coinciding with the first playback interval to the first computational device via the first stream in Block S260; and, in response to completely transcoding the rendition segment in the first rendition, storing the rendition segment in the rendition cache in Block S270.

One variation of the method S200 includes: identifying a set of keyframe timestamps corresponding to keyframes in the audio-video file in Block S202; segmenting the audio-video file to define a set of mezzanine segments, each mezzanine segment including a portion of the audio-video file within a keyframe interval beginning at an initial keyframe timestamp in the set of keyframe timestamps and terminating at a terminal keyframe timestamp in the set of keyframe timestamps in Block S204; storing the set of mezzanine segments as a mezzanine encoding of the audio-video file in Block S210; publishing a stream for the audio-video file to a first audio-video player instance, the stream indicating availability of a supported rendition of the audio-video file; and receiving a first request from the first audio-video player instance for a playback segment of the audio-video file in the supported rendition, the playback segment defining a playback interval in Block S220. This variation of the method S200 also includes, in response to identifying absence of the playback segment in the supported rendition from a rendition cache and identifying absence of an assignment to transcode the playback segment into the supported rendition: identifying a consecutive subset of mezzanine segments in the set of mezzanine segments, each mezzanine segment in the subset of mezzanine segments defining a keyframe interval coinciding with the playback interval in the audio-video file in Block S250. This variation of the method S200 further includes, for each mezzanine segment in the consecutive subset of mezzanine segments: concurrently transcoding the mezzanine segment into a rendition segment in the supported rendition and transmitting the rendition segment coinciding with the playback interval to the first audio-video player instance in Block S260; and, in response to completely transcoding the rendition segment in the supported rendition, storing the rendition segment in the rendition cache in Block S270.

Another variation of the method S200 includes: receiving the audio-video file as a livestream including a stream of audio-video data in Block S206; and assigning a first worker to cache the stream of audio-video data in Block S208. This variation of the method S200 also includes, at the first worker, for a duration of the livestream: segmenting the stream of audio-video data as a set of mezzanine segments, each mezzanine segment in the set of mezzanine segments including a portion of the stream of audio-video data beginning at an initial keyframe and terminating at a terminal keyframe in Block S204; and caching the set of mezzanine segments in a mezzanine cache in Block S212. This variation of the method S200 further includes: receiving a request, from a first computational device, for a first playback segment of the livestream in a first rendition, the first playback segment defining a first playback interval in the livestream in Block S220. This variation of the method S200 additionally includes, in response to identifying absence of the first playback segment in the first rendition in a rendition cache and identifying absence of an assignment to transcode the first playback segment into the first rendition: assigning a second worker to transcode the first playback segment in the first rendition in Block S230; and initiating a first stream between the second worker and the first computational device in Block S240. This variation of the method S200 also includes, at the second worker: accessing the set of mezzanine segments from the mezzanine cache; and identifying a first consecutive subset of mezzanine segments in the set of mezzanine segments coinciding with the first playback interval in the livestream in Block S250. This variation of the method S200 further includes, for each mezzanine segment in the consecutive subset of mezzanine segments: concurrently transcoding the mezzanine segment into a rendition segment in the first rendition and transmitting the rendition segment coinciding with the first playback interval to the first computational device via the first stream in Block S260; and, in response to completely transcoding the rendition segment, storing the rendition segment in the rendition cache in Block S270.

12. Applications

Generally, a computer system (e.g., a server, a computer network) can execute Blocks of the method S200 to: ingest a new audio-video file (hereinafter the "AV file"); publish a stream (e.g., an HLS stream) advertising renditions of the AV file prior to transcoding the renditions; in response to receiving a request to stream the AV file, concurrently transcode and stream rendition segments of the AV file; store the rendition segments in memory; serve the stored rendition segments when requested at later times; and repeat this process to populate a rendition cache with advertised renditions of the AV file responsive to first requests for these rendition segments.

In particular, the computer system executes Blocks of method S200 to: receive and normalize an AV file into a supported encoding and container format; identify keyframes in the AV file; segment the AV file based on the keyframes to create mezzanine segments for each AV file; and publish the stream to instances of AV players on multiple devices (e.g., by generating a manifest file). When the computer system receives a request for a playback segment from an instance of an AV player, the computer system: maps the playback segment to coincident rendition segments; and identifies whether mezzanine segments corresponding to the coincident rendition segments were previously transcoded and stored in memory (e.g., in a database, a rendition cache) or are currently queued for transcoding in the requested rendition. If the mezzanine segments were previously transcoded into corresponding rendition segments and stored in a rendition cache, the computer system then clips the corresponding rendition segment to create the requested playback segment and returns the requested playback segment to the instance of the AV player. However, if the computer system has not yet transcoded the rendition segments, the computer system initiates a just-in-time transcoding process to: concurrently transcode the corresponding mezzanine segment into a coincident rendition segment; stream the playback segment including the coincident rendition segment to the requesting instance of an AV player; and store the rendition segment in the rendition cache for future distribution.

Therefore, the computer system can compile a full set of transcoded rendition segments for the AV file, wherein each rendition segment is transcoded in (near) real-time following a first request for this rendition segment from an AV player instance after—rather than before—the AV file is published for streaming. Thus, the computer system can greatly reduce the time-to-publication of an AV file. Additionally, the computer system can reduce the immediate computational requirements for transcoding an AV file into a number of advertised renditions in a short period of time (i.e. before publishing the stream of the AV file) and can instead spread this computational load over a longer period of time. Furthermore, by transcoding rendition segments of the AV file on-demand, the computer system can conserve storage space for the time period before each rendition segment is requested for the first time. The method S200 can also enable dynamic switching of renditions advertised at a stream of the AV file without interruption of the stream thereby allowing for improved customization of rendition ladders for particular AV files and/or viewing conditions.

In one example, the computer system can improve storage utilization in a rendition cache by recording viewing data for each AV file categorized by requested rendition and by segment. Then, based on the viewing data, the computer system can selectively delete rendition segments to reduce the memory footprint of the AV file and corresponding renditions of the AV file for infrequently requested segments, and re-transcode the deleted segments upon receiving a request. Additionally or alternatively, the computer system can selectively transcode segments in advance (e.g. the first segment in each rendition) to optimize streaming performance in the majority of viewing cases while saving the computational time of transcoding the entire rendition.

In order to transcode and stream a rendition of an AV file in (near) real-time (e.g., within 500 milliseconds), the computer system segments the AV file based on keyframe timestamps in the AV file to generate a set of mezzanine segments, which the computer system stores in the mezzanine cache. Therefore, the computer system ensures that each segment is individually addressable and can be individually stored, transcoded, and streamed, which enables more efficient uses of computational resources—such as server processing power and storage time—by facilitating distribution of those computational resources over time.

The computer system can include or interface with: a playback server; a storage layer abstraction (hereinafter "the storage manager"); a scheduler; a transcoding resource cluster (hereinafter "the worker cluster"); and/or other computational components to queue or execute Blocks of the method S200. For example, the playback server can receive requests for particular playback segments and request access to rendition segments coinciding with the playback segments in the AV file via the storage manager. In this example, the storage manager can direct the playback server to the location of a cached rendition segment, initiate a peer-to-peer stream between a worker (in the worker cluster) already transcoding the rendition segment and the playback server, and/or prompt the scheduler to assign a worker to transcode the rendition segments coinciding with the playback segment.

2.1 Variations

In one variation of the method S200, the computer system can reduce latency and computational load for live streaming applications by transcoding portions of a livestream or various offered renditions of the livestream on-demand via the just-in-time encoding process rather than automatically transcoding the livestream into all offered renditions before any AV players request to view the livestream.

In another variation of the method S200, the computer system can produce video thumbnails or thumbnail images by selectively decoding AV segments that contain the video frames that include the thumbnail. For example, a video thumbnail can be displayed shortly after publication of the video by specifying a time interval for the video thumbnail and selectively transcoding the segments corresponding to the video thumbnail in each rendition offered by the computer system immediately after publication. Therefore, the computer system can improve the publishing time for thumbnails of the AV file.

In a yet another variation of the method S200, the computer system can integrate advertisements or any other AV content within an AV stream. Advertisements may be served during a streaming video at a different resolution, bitrate, and possibly a different aspect ratio when compared to the streaming video. Furthermore, AV players may pause the original stream in order to display an advertisement served by a different computer system or application than the computer system or application serving the original AV stream. Thus, when executing the method S200, the computer system ingests and just-in-time transcodes the advertisement selected for an AV stream to the same rendition of the original stream such that the advertisement can be integrated into the stream.

In another variation of the method S200, the computer system can serve view-specific watermarks for a video. For example, rather than performing a just-in-time transcoding of the mezzanine segment, the segment can watermark the AV segment during the transcoding process such that the watermark can be displayed in the requested rendition of the AV file.

Another variation of the method S200 includes: transmuxing received AV files into a supported audio or video encoding format or transmuxing them into a supported container format; selectively transcoding particular segments to reduce the keyframe interval within those segments; selectively remuxing particular segments to normalize timestamps within those segments; adding encoded audio data buffers (e.g. priming or trailing buffers) on either or both ends of the encoded video data for each segment to reduce edge encoding effects in the rendition segment; concurrently transcoding a rendition segment and streaming a playback segment from the rendition segment on a per segment basis; transcoding a rendition segment into a temporary data buffer rather than a rendition cache for one time presentation of the stream; and transcoding rendition segments corresponding to subsequent playback segments in parallel with the rendition segments corresponding to the request playback segment.

2.2 Terms

Generally, the term "stream," as used herein, refers to a bitstream of encoded audio, video, or any other data between two devices or computational entities executing on devices (e.g., AV players executing on a mobile computing devices) such as an HLS, HDS, or MPEG-DASH stream. Therefore, the computer system can initiate streams between servers in the computer system, between the computer system and a content delivery network (hereinafter "a CDN"), or between the computer system and any other computational device.

Generally, the term "segment," as used herein, refers to a series of encoded audio and/or encoded video data corresponding to a particular time interval or consecutive series of frames in an AV file or AV stream.

Generally, the term "mezzanine," as used herein, refers to a file (e.g., an AV file) format for encoding and/or editing that is resilient to generation loss. For example, a "mezzanine segment" refers to a segment of an AV file cached by the computer system that derives from the original version of the AV file uploaded to the computer system. Thus, a mezzanine segment can be encoded and/or transcoded multiple times based on different parameters and remain similar in quality as the original version.

Generally, the term "rendition" refers to any encoding of an AV file that is indicated in the rendition manifest or manifest file (e.g., an HLS manifest) for a stream of the AV file. Therefore, a "rendition segment" refers to a segment of the AV file that has been transcoded at a bitrate and/or resolution different from the mezzanine segment. The computer system can transcode any mezzanine segment into multiple corresponding rendition segments in various renditions representing the same time interval in the AV file at differing bitrates and resolutions.

Generally, the term "playback segment" refers to a segment requested by a CDN or directly from an AV player specifying a time interval in the AV file and a rendition of the AV file to be served and played by the computer system. Therefore, a playback segment coincides or is coincident with a mezzanine segment or rendition segment if a time interval defined by the playback segment temporally overlaps with the mezzanine segment or rendition segment in the AV file respectively. Additionally or alternatively, the AV player or CDN can request a playback segment by specifying an index (e.g., a segment number) of a total number of playback segments in the AV file (e.g., based on a playback segment duration). Therefore, the computer system can calculate a playback interval by in the AV file based on the index of the requested playback segment and a known (or specified) playback segment duration (e.g., 5 seconds).

Generally, the computer system can interface directly with an AV player instance on a local computing device. Alternatively, the computer system can serve a stream of the AV file to a content delivery network (hereinafter "CDN"), which can relay the stream of the AV file to the AV player instance. For ease of explanation, any discussion herein of requests by an AV player instance are also applicable to requests by CDNs.

13. Content Ingest and Normalization

As shown in FIG. 4, the computer system stores an AV file in order to prepare the original encoding of the AV file for streaming. Generally, the computer system temporarily stores received AV files in order to analyze and prepare the AV file for steps of the method S200.

In one implementation, once the computer system normalizes the AV file and stores the normalized AV file in a mezzanine format (e.g., a normalized original or root format from which other versions of the AV file are transcoded), the computer system can delete the original ingested AV file. In one implementation, the method S200 can include receiving an HTTP post request to upload the file to the computer system executing the method S200. Additionally or alternatively, the computer system can receive a URL specifying the current storage location of the AV file via an HTTP post and the system can download the AV file from the current storage location of the AV file. However, computer system can store the AV file in any other way.

Before performing keyframe identification, as shown in FIG. 4, the computer system can normalize AV files by: identifying keyframe timestamps in the AV file in Block S202; and segmenting the AV file into a set of mezzanine segments according to the identified keyframe timestamps in Block S204. The computer system can also selectively transcode, transmux, or remux an ingested AV file, depending on the characteristics of the AV file, in order to prepare the ingested AV file for segmentation. For example, the computer system can transcode, transmux, or remux the ingested AV file based on the audio codec and video codec of the encoded audio data and the encoded video data respectively, as well the container format used to store the encoded audio data and the encoded video data. In one implementation, the computer system can ingest multiple codecs and container formats. In some implementations, the computer system normalizes AV files to a preferred audio codec(s), video codec(s), and/or container format(s). In one example, the computer system normalizes to the AAC audio codec, the H.264 video codec, and the MPEG-TS container format.

In one implementation, the computer system detects the audio codec, video codec, and container format of the received AV file. If the detected container format differs from the preferred container format, the computer system can transmux the ingested AV file into the preferred container format. Additionally or alternatively, if the detected audio or video codec for the encoding of the audio and video data of the AV file differs from the preferred audio or video codec, the computer system can transcode the encoded audio data and/or the encoded video data using the preferred codec.

13.1 Transcoding

In one implementation, the computer system transcodes the ingested AV file into a preferred audio encoding and/or video encoding. If only the audio encoding of the ingested AV file differs from the preferred audio encoding, the computer system can transcode only the encoded audio data of the AV file. If only the video encoding of the ingested AV file differs from the preferred video encoding, the computer system can transcode only the encoded video data of the AV file. If both the audio and video encodings differ from the preferred audio and video encodings, the computer system can transcode the encoded audio data and the encoded video data.

The computer system can execute a variety of common decoders in order to transcode ingested encoded data into a preferred encoding. In one implementation, the computer system can encode the decoded ingested data losslessly and at a high quality in order to preserve the original AV file in a new encoding. Additionally or alternatively, the computer system can satisfy the minimum and maximum keyframe intervals discussed below when transcoding the encoded video data of the AV file.

Additionally, the computer system can transcode the ingested AV file based on characteristics of the encoded audio data or the encoded video data of the AV file. For example, if the bitrate of the encoded data is above a threshold bitrate the encoded data can be transcoded to a lower bitrate. Furthermore, the system can initiate transcoding based on threshold values of other parameters, such as resolution and maximum keyframe interval.

The computer system can serve AV files including encoded audio data and encoded video data stored in any multimedia container format. The computer system can also ingest AV files including encoded audio data and encoded video data encoded according to any supported codec and in any resolution, aspect ratio, frame rate, or audio sampling rate supported by those codecs.

13.2 Transmuxing

In one implementation, the computer system performing the method S200 transmuxes the ingested AV file into a preferred container format, if the container format of the ingested AV file differs from a preferred container format. The method S200 can include the transmuxing step in addition to the transcoding step, if both the audio and/or video encodings and the container format of the ingested AV file differ from the preferred audio and/or video encoding and container respectively. The computer system can include a variety of common demuxers in order to transmux the ingested AV file into a preferred container format. In one implementation, the computer system performs the same timestamp normalization discussed below with respect to timestamp remuxing while transmuxing an ingested AV file.

13.3 Timestamp Remuxing

In one implementation, the computer system normalizes the timestamps provided by the container format of the AV file. The computer system can normalize timestamps of the received AV file even if the ingested AV file is already in the preferred container format. By thus normalizing the timestamps, the computer system can reduce audio transcoding artifacts and desynchronization between audio and video content when the computer system later transcodes this content in Block S260 described below.

Depending on the original encodings of the audio and video data, and the original container format of the ingested AV file, initial timestamps corresponding to the initial frames of audio and video data may be represented as being before the start time of the AV file (e.g. negative timestamps). Alternatively, the initial timestamps of the ingested AV file may be arbitrarily delayed relative to the start time of the AV file, such as due to the insertion of priming samples or encoder delay inherent in many audio codecs.

Additionally, most container formats only specify the occurrence of timestamps at a minimum frequency within the stream, thereby relying on the AV player to properly synchronize audio and video frames in-between timestamps. In essence, there is no guarantee that timestamps will be present in the ingested AV file at the points at which the encoded audio data and the encoded video data will be segmented into separate files. Without prior timestamp normalization, audio frames that are not synchronized with video frames may be included in the same segment upon segmentation by the computer system.

The computer system remuxes the ingested AV file in the preferred container format to resolve inconsistencies amongst ingested AV files in priming sample timestamps, timestamp frequency and timestamps at keyframe locations in the ingested AV file. In one implementation, the computer system remuxes to delete any empty or null audio frames and adds a timestamp of time zero at the first priming sample required by the audio codec. The computer system can then offset the timestamps of the video frames from time zero by the duration of the priming samples or audio encoding delay. For example, if the AV file is stored using the MPEG-TS container format and MPEG-TS is one of the preferred container formats of the computer system, the computer system can shift the presentation timestamps of the audio frames such that the first priming samples are decoded at time zero, while also shifting the presentation timestamps of the video frames so they are offset from time zero by the audio encoding delay.

In one implementation, the computer system remuxes the ingested AV file to increase the frequency of timestamps for frames in the AV file. For example, the computer system can add timestamps to each audio frame in order to precisely identify which audio frames are to be decoded and presented with each video frame at the AV player. In another implementation, the computer system remuxes the AV file to include timestamps at the keyframes or "intra-frames" of the AV file. However, the computer system can normalize the timestamps of an AV file in any other way that facilitates AV file segmentation.

14. Keyframe Identification

As shown in FIG. 4 in Block S202, the computer system identifies a set of keyframe timestamps corresponding to keyframes in the encoded video data. Generally, the computer system identifies keyframes as potential segmentation points in the AV file thereby enabling the computer system to decode each segment based on an initial keyframe in the segment without first transcoding prior encoded video data outside of the segment. In one implementation, the computer system identifies keyframes based on header information for each encoded video frame in the video encoding. For example, in a H.264 encoding, keyframes are encoded as "I-frames" or more specifically as Instantaneous Decoder Refresh (hereinafter IDR) frames. Therefore, the computer system scans the encoded video data of the AV file to identify IDR frames, and subsequently determines a timestamp from the container format associated with the IDR frame. However, the computer system can execute an equivalent process for identifying keyframe timestamps for any encoding or container format.

14.1 Maximum Keyframe Intervals

To ensure efficient segmentation of the AV file, the computer system executing the method S200 can calculate a keyframe interval between each pair of consecutive keyframes in the encoded video data of the AV file and compare the calculated keyframe interval to a maximum keyframe interval. Then, in response to any of the calculated keyframe intervals exceeding the maximum keyframe interval, the computer system can re-encode the encoded video data of the AV file to insert additional keyframes and generate a re-encoded AV file. Therefore, in the re-encoded AV file, the computer system can ensure that each keyframe interval in the re-encoded AV file is less than the maximum keyframe interval. Generally, the computer system calculates the keyframe interval in an AV file by determining the time between consecutive keyframes in the encoded video data of the AV file. For example, in H.264 encoded video data a keyframe interval would be the time between consecutive IDR frames. If the computer system utilizes a relatively long maximum keyframe interval, the largest segments may take extra computational time to encode and are more likely to only minimally overlap with a playback segment when compared to a preferable maximum keyframe interval.

Alternatively, if the computer system utilizes a relatively short maximum keyframe interval, the computer system may perform more transcoding before segmentation and may use more computational time in retrieving multiple segments from memory since more segments may coincide with a playback segment of the same length when compared to a preferable maximum keyframe interval. Thus, the maximum keyframe interval may be set at a value that balances the above described effects based on the relative costs of upfront transcoding time, rendition transcoding time, and storage time. In one implementation, the computer system utilizes a maximum keyframe interval of ten seconds.

Alternatively, the computer system re-encodes the encoded video data if the average keyframe interval is above a threshold average keyframe interval. The computer system can also compare any other statistic based on keyframe interval length to a threshold value of that statistic and re-encode the received AV file based on that comparison. However, the computer system can limit keyframe intervals in any other way.

In one implementation, the computer system can calculate a maximum keyframe interval for an AV file by: identifying a bitrate of the AV file, a resolution of the AV file, and/or a video codec of the AV file; and calculating a maximum keyframe interval as a function of the bitrate, the resolution, and/or the video codec of the AV file. The maximum keyframe interval function can define a shorter maximum keyframe interval for higher-resolution and higher-bitrate AV files or AV files encoded with a high complexity codec in order to reduce the computational costs of retrieving and transcoding the more memory-intensive segments. Correspondingly, the maximum keyframe interval function can define a longer maximum keyframe interval for lower-resolution and lower-bitrate AV files or AV files encoded with a low complexity codec.

14.2 Selective Reencoding

Upon an identification that a keyframe interval exceeds a maximum keyframe interval, the computer system can selectively re-encode the identified keyframe interval before segmentation. For example, if the maximum keyframe interval is 20 seconds and keyframe intervals of 40 seconds and 120 seconds are identified in the encoded video data, the method S200 can include reencoding only the 40 second and 120 second segments of the identified intervals of the encoded video data to place more frequent keyframes. The computer system can selectively re-encode the encoded video data at keyframe intervals longer than the maximum keyframe interval and insert keyframes such that no keyframe intervals exceed the maximum in the re-encoded AV file. Additionally, the computer system can selectively re-encode keyframe intervals for any other reason.

15. Segmentation

As shown in FIG. 4, the computer system can: access a normalized AV file and segment the AV file into a set of mezzanine segments in Block S204, wherein each mezzanine segment in the set of mezzanine segments includes: a segment of encoded video data beginning at an initial keyframe timestamp and terminating at a terminal keyframe timestamp; a segment of encoded audio data beginning at the initial keyframe timestamp and terminating at the terminal keyframe timestamp; a priming audio data buffer beginning at a priming timestamp preceding the first keyframe timestamp by a priming buffer duration and terminating at the initial keyframe timestamp; and a trailing audio data buffer beginning at the terminal keyframe timestamp and terminating at the trailing timestamp delayed from the terminal keyframe timestamp by a trailing buffer duration.

Generally, the computer system segments the ingested and normalized AV file, such that each mezzanine segment of encoded video and audio data can be just-in-time transcoded into a corresponding rendition segment when requested by an AV player or CDN. By segmenting the encoded video data at keyframes in the encoded video data, the computer system ensures that each segment can be individually transcoded without relying on video frames outside of the segment. More specifically, each mezzanine segment includes encoded video data that begins with a keyframe and ends with the frame immediately before the second keyframe. Therefore, each segment in the set of mezzanine segments includes a consecutive set of video frames of the AV file beginning with and including the initial keyframe and terminating immediately prior to (i.e. not including) a terminal keyframe. However, due to the overlapping and frequency-encoded nature of audio samples in most encodings of audio data, the computer system can segment an additional priming buffer and a trailing buffer of the encoded audio data. For example, the computer system can include 200 milliseconds of encoded audio data both before and after the keyframes that form the boundaries of a particular segment of the encoded video data, thereby creating a segment with 400 milliseconds more encoded audio data than encoded video data. The computer system includes a priming buffer and/or trailing buffer of encoded audio data in each mezzanine segment to prevent edge encoding effects from occurring when the computer system transcodes mezzanine segment into a rendition segment prior to streaming. Alternatively, the computer system can store audio data segments characterized by the same length as the encoded video data segments and reference adjacent audio segments when transcoding a mezzanine segment into a new rendition such that the computer system can offer the mezzanine segments as a playable rendition of the AV file.

In one implementation, the computer system generates mezzanine segments that each include a segment of encoded audio data, a segment of encoded video data, a start time and duration and/or end time of the segment, and a sequence number of the segment such that each mezzanine segment is individually addressable and can be retrieved and transcoded individually from the mezzanine cache.

In one implementation, the computer system implements a minimum segment length in order to create segments at keyframes greater than the minimum segment length apart. For example, if the minimum segment length is two seconds, the computer system segments the AV file at keyframes at least two seconds apart. Therefore, in this implementation, the computer system can define segment boundaries at keyframes, but the resulting mezzanine segments can include additional keyframes in between the boundary keyframes.

In one implementation, the computer system stores the mezzanine segments in a mezzanine cache. The mezzanine cache stores the mezzanine file (e.g. the normalized original AV file) in mezzanine segments, which can then be transcoded into rendition segments. In one implementation, the mezzanine version of the ingested AV file, stored in the mezzanine cache, can be offered as a rendition version if the ingested version of the AV file is satisfactory for streaming. In implementations in which the computer system includes a priming buffer and/or trailing buffer in the encoded audio data of the AV segment, these buffer sections of the audio are removed during playback or re-encoded as a shorter segment.

16. Livestream Ingest, Normalization, and Segmentation

Generally, the computer system can execute Blocks of the method S200 to ingest AV livestreams in addition to AV files of a fixed length (i.e. file size). More specifically, the computer system can: receive the audio-video file as a livestream including a stream of audio-video data in Block S206; and assign a first worker to cache the stream of audio-video data in Block S208. The computer system (via the worker) can then segment the stream of audio-video data as a set of mezzanine segments, each mezzanine segment in the set of mezzanine segments including a portion of the stream of audio-video data beginning at an initial keyframe and terminating at a terminal keyframe in Block S204; and caching the set of mezzanine segments in a mezzanine cache in Block S212. Therefore, for the duration of a livestream, the system can identify keyframes in the livestream and cache mezzanine segments for later transcoding. By delaying transcoding of the livestream to a set of supported renditions the computer system can avoid transcoding a livestream into multiple extraneous renditions before the livestream is viewed at an AV player in a supported rendition. Therefore, while caching mezzanine segments for a livestream, the system can execute any of the abovementioned evaluations and, in response, remux, transmux, and/or transcode the livestream such that the mezzanine segments of the livestream are in the preferred format and encoding for subsequent transcoding into rendition segments via the just-in-time transcoding process.

17. Rendition Manifest

As shown in FIG. 4, the computer system publishes a stream for the audio-video file to an audio-video player. Upon storing the segmented mezzanine version of the ingested AV file in the mezzanine cache, or other suitable location, the computer system can publish a rendition manifest or manifest file (e.g. an HLS manifest) indicating the rendition encodings (i.e. bitrate-resolution pairs) in which the AV file is being offered and indicating a URL at which to request playable segments of the AV file. Thus, the computer system can: generate a manifest file indicating a set of renditions including the supported rendition; and transmit the manifest file to an AV player instance prior to transcoding the audio-video file in the supported rendition.

By executing the method S200, the computer system can just-in-time transcode individual mezzanine segments into specific rendition segments, thereby enabling the computer system to publish a stream of the AV file before performing any transcoding of the mezzanine segments of the AV file into the rendition segments advertised in the manifest file. The computer system can also dynamically update a previously published rendition manifest and transcode additional rendition versions of the mezzanine segments in response to changes in viewing behavior or viewing context of the AV file. In one implementation, the method S200 includes providing HLS .m3u8 manifests to instances of AV players on many devices, wherein the .m3u8 manifests indicate the resolution, aspect ratio, audio sample rate, audio encoding, and video encoding for a given bandwidth and screen size. However, the computer system can publish a stream of an AV file in any other way.

18. Rendition Cache

In one implementation, upon executing Blocks S260 and S270, the computer system can create a rendition cache and store rendition segments in the rendition cache. Each rendition segment in the rendition cache is temporally aligned with a corresponding mezzanine segment in the mezzanine cache and therefore has the same initial keyframe timestamp and terminal keyframe timestamp as its corresponding mezzanine segment. The rendition cache is organized in a database to mirror the mezzanine segments so that it can accept transcoded versions of each mezzanine segment of the AV file. In addition to specifying a location for each rendition segment corresponding to each mezzanine segment, the rendition cache also specifies a set of segment locations for each rendition in the rendition cache. Furthermore, the rendition cache can separate store audio rendition segments and video rendition segments such that the computer system can separately transcode, delete, or stream various bitrates and qualities for the audio data and video data of the same AV file. However, rendition segments corresponding to mezzanine segments can be stored in anyway at the computer system.

19. Streaming System

Figure 6:
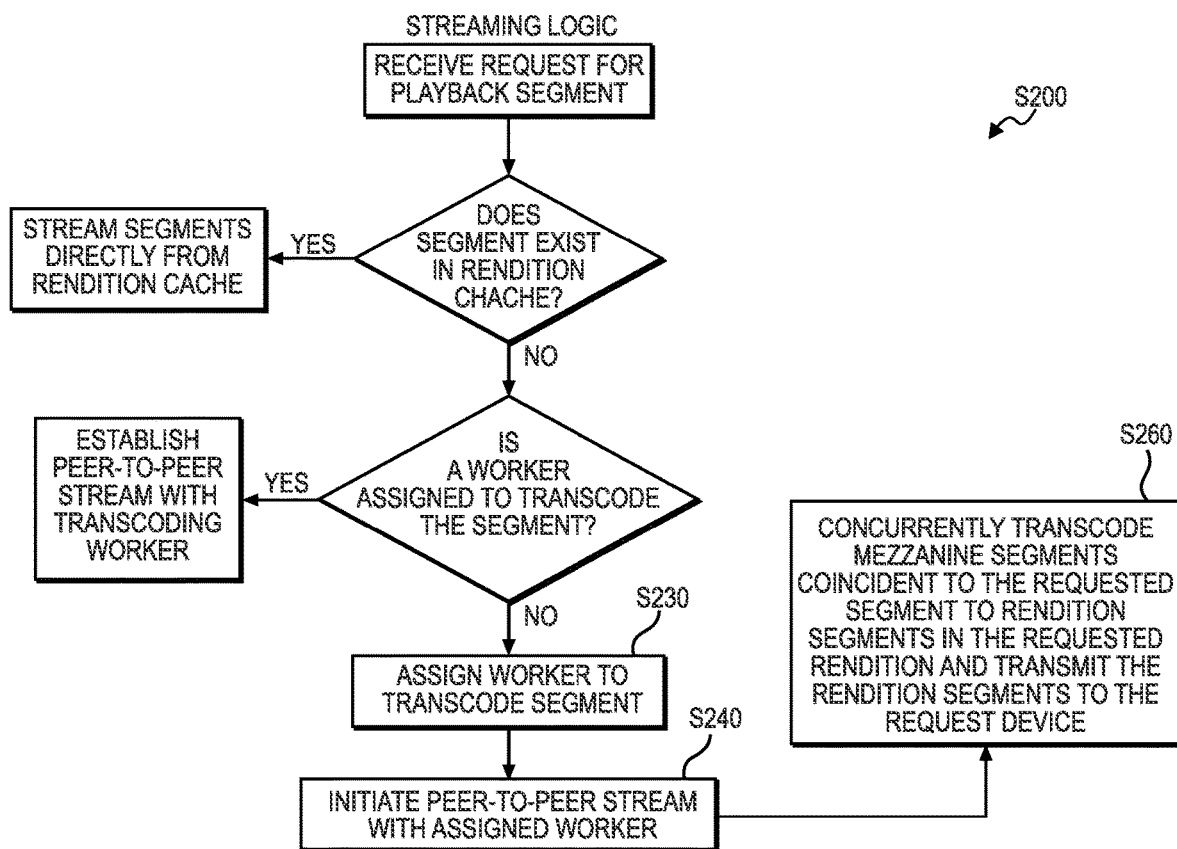
FIG. 6 is a flowchart representation of one variation of the method.
Figure 7:
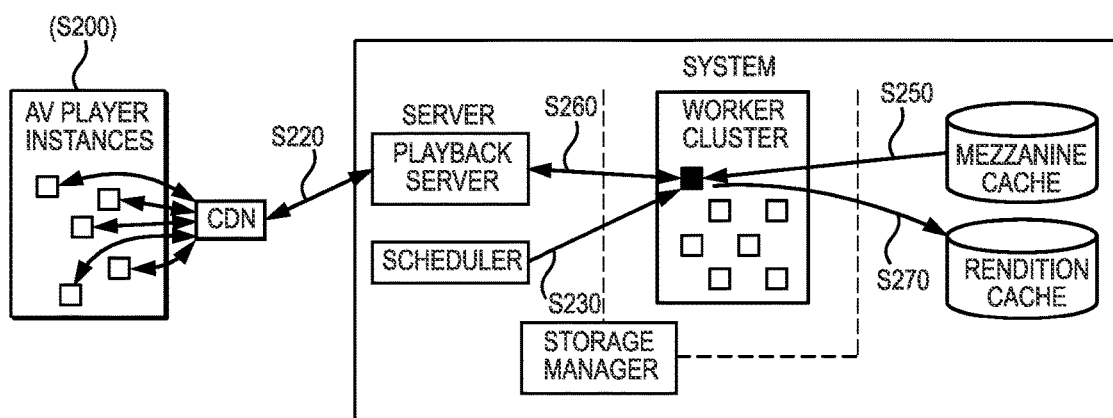
FIG. 7 is a schematic representation of one variation of the method.

As shown in FIG. 6, the computer system can include multiple servers executing various Blocks of the method S200. The computer system can leverage the architecture described herein in order to transcode and stream rendition versions of the AV file just-in-time (e.g., prior an adaptive bitrate encoder adapts to a lower bitrate in response to a slow response time from the computer system). Therefore, in one implementation, the computer system includes a playback server, a storage manager, a scheduler, and a worker cluster, thereby enabling efficient allocation of various Blocks of the method S200 to different computational entities within the computer system. However, the computer system can include additional or fewer computational components.

The playback server consolidates requests for playback segments from AV player instances and CDNs and, in response to receiving a request for a playback segment, queries the storage manager to identify the location of a set of rendition segments coinciding with the requested playback segment. The storage manager can then reply with a location of the set of rendition segments in the rendition cache or at a worker currently transcoding the rendition segments. Alternatively, the storage manager can direct the playback server to standby for the location of the requested set of rendition segments while the scheduler assigns a worker to transcode the rendition segment from a corresponding mezzanine segment. Upon identifying the location of the rendition segment from the storage manager, the playback server can also relay transcoded rendition segments to the request CDN or AV player instance as the requested playback segment. In one implementation, the playback server is implemented as a server cluster rather than a single server.

The storage manager is an abstraction layer separating the playback server from the rendition cache and worker cluster, which can just-in-time transcode. Therefore, upon receiving queries for the locations of particular rendition segments or mezzanine segments, the storage manager can provide the location of the queried segment regardless of its current status (e.g., either as a stream from a just-in-time transcode or directly from the rendition cache). In one implementation, the storage manager interacts with other entities in the computer system via RPC connections and can notify the playback server to standby before returning the location of a newly assigned worker that has been assigned by the scheduler to just-in-time transcode a set of rendition segments coinciding with a requested playback segment.

The scheduler can allocate and assign workers in the worker cluster to various tasks of the computer system. For example, the scheduler can assign workers to ingest AV files, cache and segment livestreams, transcode mezzanine segments into rendition segments, or any other computational function of the computer system. The scheduler can assign a worker to complete a task immediately or can allocate the worker to execute the task in the future (e.g., upon receiving a request or upon caching a particular mezzanine segment in the mezzanine cache). The scheduler can report identifying addresses for workers assigned or allocated for each task to the storage manager such that the storage manager can direct the playback server or other workers to the correct locations in the computer system. Additionally or alternatively, each worker can notify the storage manager of their own identifying address upon being assigned or allocated to transcode a mezzanine segment to a particular rendition segment such that the storage manager can direct the playback server to the workers' address and retrieve rendition segments being transcoded by the assigned worker.

The worker cluster can include a set of servers within the computer system that can be assigned to transcoding, caching, or any other Block of the method S200. Each worker in the worker cluster is individually addressable and is capable of concurrently transcoding a mezzanine segment to a rendition segment and streaming the rendition segment to the playback server or directly to a CDN or AV player via a peer-to-peer stream. Therefore, the computer system can coordinate a peer-to-peer stream with the playback server and any worker in the worker cluster. In one implementation, the worker can package transcoded segments (e.g., 50 kilobyte segments) of a rendition segment according to a standard transport protocol before streaming the rendition segment to the playback server. The worker can concurrently (e.g., in parallel or alternating in series) transcode a subsequent segment of the rendition segment in preparation for streaming the subsequent segment. Therefore, the worker can transcode and stream a rendition segment faster than real-time enabling just-in-time transcoding of request renditions of an AV file.

20. Streaming

As shown in FIG. 4 in Block S220, the computer system can receive a first request generated by the first AV player instance (or by a CDN) for a playback segment specifying a rendition and a playback interval. Generally, an AV player can utilize the rendition manifest and the provided URL to request a rendition of an AV file from the computer system.

In one implementation, the computer system can receive and process an HTTP request conforming to the HLS standard.

Once the computer system receives the request for a playback segment, the method S200 includes identifying a consecutive subset of mezzanine segments in the set of mezzanine segments of the requested AV file with at least one of the initial keyframe timestamp and the terminal keyframe timestamp of each mezzanine segment in the subset of AV segments occurring within the playback interval of the requested playback segment. Generally, the computer system determines which of the mezzanine segments coincide with or temporally overlap (based on timestamps) with a requested playback segment in Block S250. Depending on the implementation, the computer system can execute Block S250 via the playback server, the storage manager, and/or workers assigned to transcode the requested playback segment.

In one implementation, the computer system compares the timestamps of the initial keyframe timestamp and the terminal keyframe timestamp of each mezzanine segment to the playback interval of the playback segment to identify mezzanine segments that overlap with the playback segment. If either the start or the end time of a mezzanine segment occurs between the start and end times of the playback segment, then the playback segment includes at least a portion of the mezzanine segment. In implementations in which the mezzanine segments are stored without priming or trailing audio buffers, the computer system can identify segments with starting times within a trailing buffer's duration of the end of the playback interval and/or segments with end times within a priming buffer's duration of the start time of the playback interval. In this implementation, the computer system ensures that a priming buffer and/or a trailing buffer are included for the playback segment.

However, the computer system can identify mezzanine segments coincident with the requested playback segment in any other way.

20.1 Streaming Logic

As shown in FIG. 5, the computer system can consolidate requests (via the playback server) received from AV players and/or CDNs according to the mezzanine segments coincident with the playback interval of each requested playback segment. Generally, the storage manager, executing streaming logic shown in FIG. 5 determines whether to stream a rendition segment corresponding to a requested playback segment directly from the rendition cache or from a worker currently transcoding the rendition segment based on whether the rendition segment already exists in the rendition cache, or whether it is currently being transcoded. The computer system evaluates streaming logic shown in FIG. 5. More specifically, the computer system can: query the storage manager for a consecutive set of rendition segments coinciding with a playback segment; evaluate whether the consecutive set of rendition segments are: a) stored in the rendition cache, b) currently transcoding at an assigned worker, or c) not assigned for transcoding.

In implementations wherein the computer system includes a rendition cache configured to store audio rendition segments separate from video rendition segments, the computer system can identify coincident audio rendition segments and video rendition segments for a requested playback segment. Therefore, the computer system can separately evaluate the status (as described above) of the coincident audio rendition segments and the coincident video rendition segments.

20.2 Just-in-Time Transcoding

The computer system can receive a request for playback of a video segment of a particular rendition having a bitrate and resolution specified by an encoding ladder. If a requested rendition segment does not exist in the rendition cache (e.g., is absent from the rendition cache) and an assignment to transcode the requested rendition segment is absent, the computer system can initiate just-in-time transcoding processes to concurrently transcode a mezzanine segment into a rendition segment coincident with the playback segment and in the requested rendition of the playback request, in Block S260. For example, in response to detecting absence of a set of video segments at the bitrate-resolution pair in the rendition cache corresponding to the requested playback segment(s), the computer system can identify a set of mezzanine segments in the video corresponding to the playback segment.

The computer system can assign this set of mezzanine segments corresponding to the playback segment to a worker, in Block S230, for transcoding to the rendition segment specified by the bitrate-resolution pair (e.g., by sequentially transcoding the consecutive coincident rendition segments). For example, the computer system can assign a set of mezzanine segments to a set of workers for transcoding such that the mezzanine segments are distributed across multiple workers. The computer system can concurrently initiate a peer-to-peer stream (e.g., via a chunked transfer encoding stream) between the worker and the playback server in Block S240. The playback server can then serve the streamed rendition segments to the requesting AV player instance or CDN. In one implementation, the playback server queries the storage manager to identify a location of a requested rendition segment. If the segment has not been assigned for transcoding and is not present in the rendition cache, the storage manager can prompt the playback server to standby until a worker is assigned to transcode the mezzanine segment to the rendition segment. Once the worker is assigned, the storage manager can provide an address of the assigned worker to the playback server, and the playback server can initiate a peer-to-peer stream with the worker in order to access the rendition segment.

Generally, the computer system (e.g., a worker assigned to transcode the playback segment) includes a decoder and encoder that can transcode a mezzanine segment into a rendition segment in a requested rendition. For example, a mezzanine segment may be encoded using H.264 at 30 Mbps with AAC audio and 1280 by 720 pixel resolution and a playback segment may be requested in H.264 at 15 Mbps with AAC audio and 640 by 480 pixel resolution. In this case, the method S200 can include transcoding the mezzanine segment to a rendition segment using the H.264 codec.

In implementations in which the mezzanine segment includes an audio segment with a priming and/or a trailing buffer, the computer system decodes the audio segment including the priming and/or trailing buffer and encodes the rendition segment without the priming and/or trailing buffer. By decoding the entire audio segment including the priming and/or trailing buffer, the computer system reduces the likelihood of edge effects due to segmentation that may occur in the transcoded rendition segment when re-encoded as the rendition segment.

In implementations in which the mezzanine segment does not include an audio segment with a priming or a trailing buffer, the computer system identifies whether the time interval of the requested segment is within a priming buffer's duration of a preceding mezzanine segment boundary or within a trailing buffer's duration of a subsequent mezzanine segment boundary. If the preceding mezzanine segment ends within a priming buffer's duration of the time interval of the requested segment, the computer system decodes the audio segment of the preceding mezzanine segment and encodes the identified rendition segment based on the preceding decoded audio segment. If the subsequent mezzanine segment begins within a trailing buffer of the time interval of the requested segment, the computer system decodes the audio segment of the subsequent mezzanine segment and encodes the identified rendition segment based on the subsequent decoded audio segment.

The AV player instance, upon receiving streamed segments (e.g., via an HLS stream), can render the video to a user at a computational device executing the AV player instance. In one implementation, the computer system can transcode a mezzanine segment and write the new rendition segment to the rendition cache on a segment-by-segment basis. The computer system can utilize the segments and their accompanying timestamps to determine which segments to include in the stream of the requested playback segment. Thus, the computer system can simultaneously write transcoded segments of the rendition segment to the rendition cache while reading segments of the rendition segment coincident with the playback segment. The computer system can then transmit the rendition AV segments to the requesting AV player instance for playback.

In one implementation, once the assigned worker has transcoded the identified mezzanine segments into corresponding rendition segments in the requested rendition, the worker can proceed to store the completed rendition segments in the rendition cache in Block S270. More specifically, the worker can: for each transcoded audio-video segment in the stream of audio-video segments, responsive to identifying that the transcoded audio-video segment includes a segment timestamp between the first keyframe timestamp and the second keyframe timestamp, store the transcoded AV segment in the rendition cache as a rendition AV segment, wherein each segment corresponds to a range of bytes in the rendition segment, in Block S270. Alternatively, the worker can store a completed copy of the rendition segment in local memory and transfer the completed rendition segment to the rendition cache upon completion of the transcode.

21. Concurrent Streaming

Figure 8A:
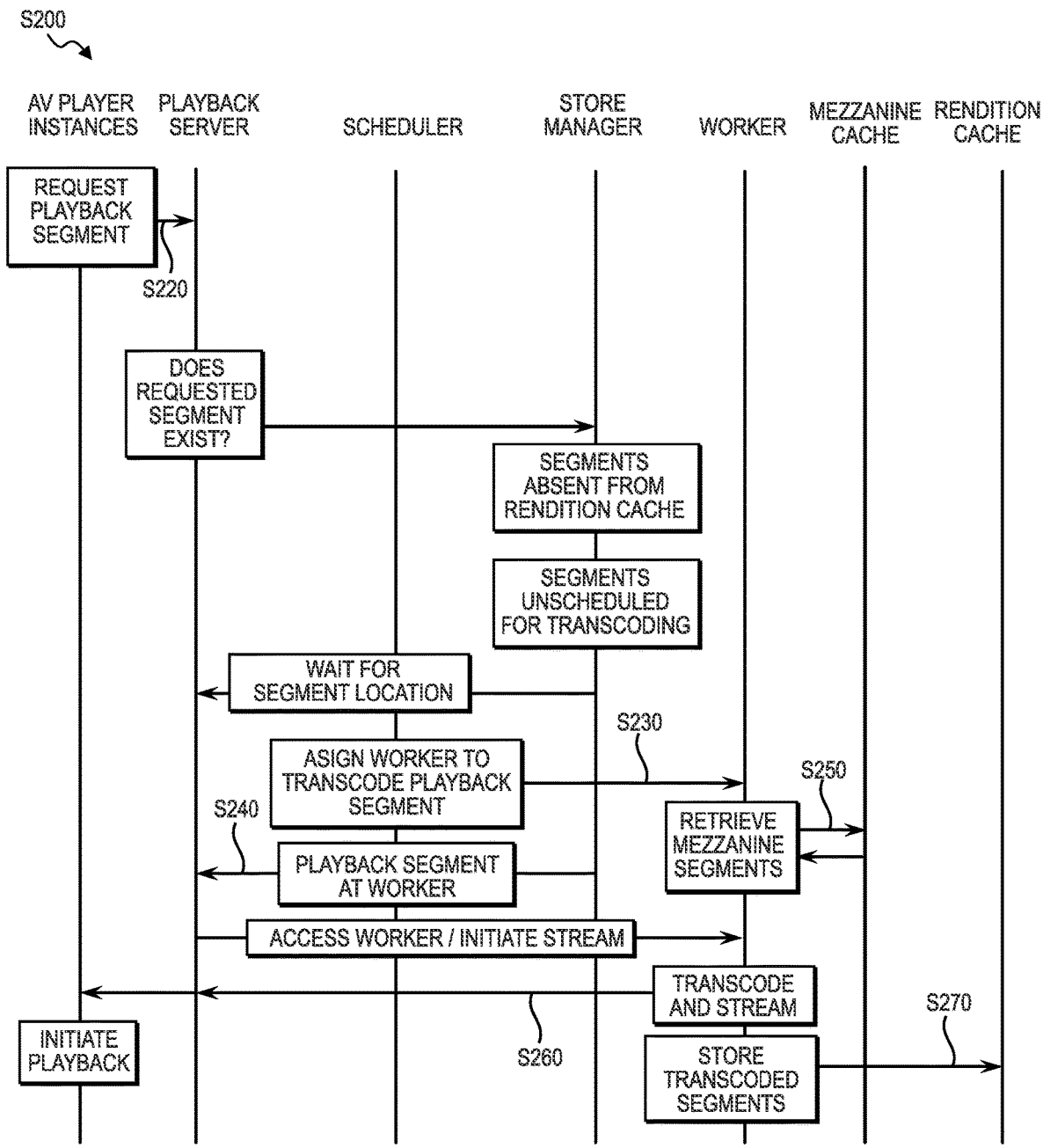
FIG. 8A is a flowchart representation of one variation of the method.

As shown in FIG. 4 and FIG. 8A in Block S260, the computer system can just-in-time transcode a requested playback segment and begin streaming the playback segment within 500 milliseconds, or within a time period such that the AV player instance does not adaptively request a reduced bitrate rendition of the AV file due to latency in the request. Generally, the method S200 accomplishes this by initiating a peer-to-peer stream between the worker and the playback server, which can then distribute the requested AV data to all requesting AV player instances or CDNs.

Thus, the computer system can: transcode a first mezzanine portion of video data from the mezzanine segment including the initial keyframe to generate a first rendition portion of the rendition segment in the first rendition; transmit the first rendition portion of the rendition segment in the first rendition to the first computational device via a peer-to-peer stream; transcode a series of successive mezzanine portions of video data from the mezzanine segment based on the initial keyframe of the mezzanine segment to generate a series of successive rendition portions of the rendition segment in the requested rendition; and, for each rendition portion in the series of successive rendition portions of the rendition segment in the requested rendition and in response to transcoding the rendition portion, transmit the rendition portion to the first computational device via the peer-to-peer stream.

Alternatively, the computer system can execute concurrent write and read operations into and out of the rendition cache or within local memory of a worker in the computer system. As a rendition segment corresponding to a requested playback segment is being transcoded from a mezzanine segment (i.e., written to the rendition cache or local memory of a worker), the computer system streams completed portions of the rendition segment to the requesting AV player. Thus, the computer system can write each portion of a rendition segment to the local memory of the worker or to the rendition cache, before immediately transmitting the portion as part of the requested playback segment in response to a portion request from the playback server. In one implementation, the computer system can store completed portions in a temporary storage buffer from which the computer system can stream the portions to an instance of an AV player. However, simultaneous streaming and transcoding from the rendition cache can be executed by the computer system in any other way.

Thus, the computer system transcodes supported renditions of the AV file over time as each rendition is requested by an AV player or CDN as part of a playback segment. Therefore, the playback server spreads the computational load of transcoding rather than transcoding all renditions of the AV file before publishing a stream of the AV file.

In implementations wherein the computer system includes a rendition cache configured to store audio rendition segments separate from video rendition segments, the computer system can concurrently stream audio rendition segments coincident with the requested playback segment from a separate location while just-in-time transcoding video rendition segments coincident with the requested playback segment (or vice versa). Thus, the computer system can conserve computational resources typically utilized to repeatedly transcode audio data into the same rendition audio segments that are paired across multiple video renditions.

21.1 Mid-Transcode Streaming

Generally, if the playback server receives a second request (e.g., from a separate AV player instance or CDN) for a rendition segment and identifies that a request for the same rendition segment has already been received, the computer system can stream portions corresponding to the requested playback segment directly from the worker in a peer-to-peer stream. More specifically, the playback server can receive the second request and query the storage manager for the location of a rendition segment coincident with the requested playback segment; the storage manager can detect that the rendition segment is not yet present in the rendition cache, but is assigned for transcoding at a worker; and the storage manager can then transmit the address of the worker to the playback server, which can initiate a peer-to-peer stream with the worker transcoding the segment.

While transcoding the rendition segment, the worker generates an addressable bitstream, in which each byte of the transcoded stream is individually addressable based on corresponding timestamps of the AV file. The computer system can therefore stream bytes corresponding to the playback segment to the requesting AV player via the playback server upon initiation of the peer-to-peer stream.

Thus, the computer system can receive a second request for a playback segment in a requested rendition. The computer system can also, in response to identifying that the playback segment is being transcoded into the requested rendition: identify the worker transcoding the playback segment via the storage manager; initiate a peer-to-peer stream between the second computational device and the worker; and, at the worker, while transcoding the subset of mezzanine segments into a consecutive subset of rendition segments in the requested rendition and for each rendition segment in the consecutive subset of rendition segments, transmit the rendition segment coinciding with the playback interval to the second computation device via the peer-to-peer stream with the second computational device.

However, the computer system can concurrently store a transcoded AV segment to the rendition cache and stream the playback segment to an AV player in any other way.

In another implementation, the computer system can: receive a request for a playback segment from the device; identify a set of rendition segments corresponding to this playback segment; query the scheduler and the rendition cache for these rendition segments; and thus identify all or a subset of these rendition segments that are currently in process (i.e., being transcoded) by machines based on the recent transcoding assignments issued by the scheduler and/or absence of these rendition segments in the rendition cache.

Accordingly, the computer system can queue transmission of these rendition segments to the device upon completion and loading into the rendition cache rather than queue the corresponding mezzanine segments for re-transcoding. Once these rendition segments are completed and stored in the rendition cache, the computer system can transmit these rendition segments to the device.

For example, the computer system can: receive a second request for the first playback segment, at a second bitrate-resolution pair in the encoding ladder, in the video from a second device; identify that the first set of mezzanine segments corresponding to the first playback segment are contemporaneously transcoding into a second set of rendition segments according to the second bitrate-resolution pair; and, in response to completion of transcoding into the second set of video segments, transmit the second set of video segments to the second device for playback at the second device. Therefore, the computer system can reduce computation of transcoding mezzanine segments by limiting mezzanine segment transcoding in a particular rendition to a single instance (i.e., by withholding transcoding if the corresponding rendition segment currently exists or is in process).

21.2 Rendition Cache Streaming

If the rendition segment already exists in the rendition cache, then the computer system streams portions of the rendition segment directly to the requesting AV player instance from the rendition cache.

In one implementation, the computer system selects rendition segments in supported renditions of the AV file (e.g., the first rendition segment in each supported rendition) in order to preempt requests to stream those rendition segments. Additionally or alternatively, the computer system can transcode the first mezzanine segment into popular rendition formats. In one implementation, the computer system can transcode rendition segments corresponding to a video or image thumbnail of the AV file and transmit a thumbnail image or video to a device.

In one implementation, a second viewer may wish to view a video file on a device different than the first device in a previously requested rendition. For example, in response to previously transcoded and stored rendition segments of the video file responsive to prior requests from one or more other users, the computer system can release stored rendition segments from the rendition cache to the computing device for playback.

Thus, the computer system can receive a second request for a playback segment in the requested rendition from a second computational device. The computer system can also, in response to identifying that the playback segment in the requested rendition is stored in the rendition cache, access a set of rendition segments in the rendition cache coinciding with the playback interval in the audio-video file; and, for each rendition segment in the consecutive subset of rendition segments, release the rendition segment coinciding with the playback interval to the second computational device.

However, the computer system can initiate just-in-time transcoding or direct streaming in any other way and can perform either just-in-time transcoding or direct streaming for any purpose.

21.3 Preemptive Transcoding

In addition to assigning workers to transcode rendition segments coinciding with playback intervals indicated in playback requests, the computer system can also preemptively assign workers to transcode (e.g., in parallel with the first transcoding worker) mezzanine segments of the AV file into rendition segments that have not yet been requested but may likely be requested in the future. More specifically, in response to receiving a request coinciding with a consecutive subset of rendition segments, the computer system can assign a worker to transcode: subsequent rendition segments in the requested rendition; subsequent rendition segments in an immediately higher rendition; and/or subsequent rendition segments in an immediately lower rendition. Therefore, the computer system can reduce latency for subsequent transcodes and mitigate disruption of streaming content due to connectivity issues between servers and requesting AV instances by preempting requests and, upon receiving those requests, provide a direct stream of the subsequent rendition segments from the rendition cache. Furthermore, by preemptively transcoding higher and lower resolution renditions of subsequent rendition segments, the computer system can anticipate adaptive changes to the requested rendition for a particular request from an AV player instance.

Thus, the computer system can, in response to receiving a request for a playback segment in a requested rendition: identify a subsequent mezzanine segment to the consecutive subset of mezzanine segments (identified in Block S250); and assign a second worker, in response to identifying that the subsequent mezzanine segment in the requested rendition is not stored in the rendition cache and is not assigned for transcoding, to transcode the subsequent mezzanine segment into a subsequent rendition segment in the requested rendition. Additionally, the second worker can just-in-time transcode the subsequent mezzanine segment into the subsequent rendition segment in the requested rendition. Upon receiving a second request for a second playback segment in the requested rendition and, in response to identifying that the subsequent rendition segment in the first rendition is stored in the rendition cache, the computer system can transmit the subsequent rendition segment in the first rendition coinciding with the second playback interval to the first computational device.

Additionally, the computer system can perform the above-mentioned preemptive transcoding process, and instead transcode a higher or lower rendition than the requested rendition in response to the first request. If the AV player instance adapts the bitrate/resolution of the AV file in response to a change in connectivity, then the AV player instance may request the preemptively transcoded rendition segments and the computer system can stream the higher or lower rendition segments to the requesting AV player instance (or CDN).

In one implementation, the computer system can also access historical seeking behavior with AV files of a similar type (e.g., a similar length, content type, visual complexity) and preemptively transcode selective future rendition segments at particular time increments in advance of the requested playback segments. For example, the computer system can assign workers to transcode rendition segments coinciding with timestamps 5, 10, 15, 20, 25, and 30 seconds ahead of the start timestamp of the currently requested playback segment. Therefore, if a user seeks ahead in the AV player instance, resulting in a request for the playback segments coinciding with the set of incremental timestamps, then the computer system can directly stream the preemptively transcoded rendition segments to the AV player instance (or CDN).

However, the computer system can preemptively transcode any rendition segment in order to reduce latency for future requests for playback segments.

22. Livestream Variation

Figure 8B:
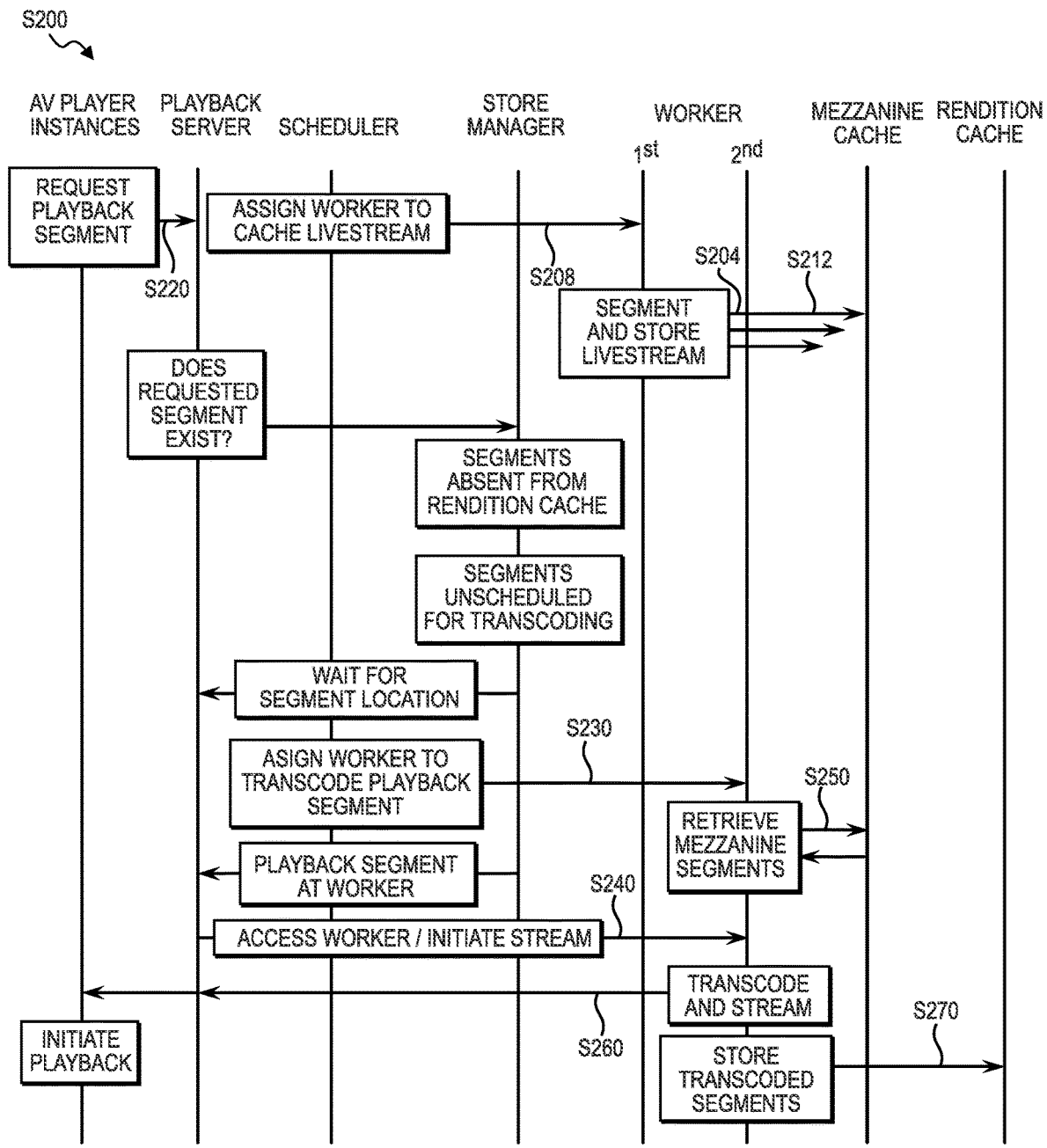
FIG. 8B is a flowchart representation of one variation of the method.

As shown in FIG. 8B, the computer system can also execute just-in-time encoding for serving an AV livestream to a set of AV player instances or CDNs. More specifically, the computer system can receive the AV file as a livestream in Block S206; and assign a first worker to cache mezzanine segments of a livestream as encoded AV data is received at the computer system in Block S208. However, the computer system can delay transcoding these segments into rendition segments in each supported rendition of the livestream until those segments are requested by an AV player instance or CDN. Therefore, the computer system leverages just-in-time transcoding to conserve computational resources transcoding each supported rendition of the livestream before the livestream is requested to be viewed at an AV player instance.

In particular, the computer system can: receive the livestream including a stream of audio-video data; and assign a first worker to cache the stream of audio-video data. The first worker can then, for the duration of the livestream: segment the stream of audio-video data as a set of mezzanine segments, each mezzanine segment in the set of mezzanine segments including a portion of the stream of audio-video data beginning at an initial keyframe and terminating at a terminal keyframe; and cache the set of mezzanine segments in a mezzanine cache.

22.1 Real-Time Stream Evaluation

In addition to caching a set of mezzanine segments of the livestream, the worker assigned to cache the livestream can also evaluate the encoding of the livestream AV data in real-time in order to identify keyframe intervals and, in response to detecting keyframe intervals greater than a maximum keyframe interval, reencode the livestream with new keyframe intervals that are less than a maximum keyframe interval. Therefore, the computer system can continuously calculate keyframe intervals in the livestream until a keyframe interval exceeds a maximum keyframe interval. The computer system can then reencode all incoming AV data of the livestream or can selectively re-encode the mezzanine segment with greater than a maximum keyframe interval duration. Thus, the computer system maintains keyframe intervals in the mezzanine segment of the livestream less than the maximum keyframe interval.

In particular, the computer system can: in response to detecting, in the stream of audio-video data, keyframe intervals greater than a maximum keyframe interval, re-encode the stream of audio-video data to generate a re-encoded stream of audio-video data, the re-encoded stream of audio-video data defining keyframe intervals less than the maximum keyframe interval; and segment the re-encoded stream of audio-video data as the set of mezzanine segments. Alternatively, the computer system can automatically re-encode the livestream to insert keyframes less than the maximum keyframe interval apart.

22.2 Worker Pre-Allocation

In one implementation, the computer system can preemptively allocate computational resources (e.g., workers) to transcoding tasks in advance of receiving requests for particular rendition segments such that the computer system can reduce the latency of the livestream upon receiving those requests. In particular, the computer system can allocate workers by notifying the storage manager of the worker that will transcode a rendition segment. However, the worker will not begin transcoding until a request for its assigned rendition segment is received at the playback server. In one implementation, the computer system can allocate workers to transcode the first (i.e., initial) rendition segment in each supported rendition of the livestream such that any device requesting to view the livestream from the beginning can experience lower latency. Additionally or alternatively, the system can allocate workers to transcode the most recently received mezzanine segment into each supported rendition of the livestream such that any AV player instance that requests to view the current livestream (e.g., live) can experience lower latency.

Thus, the computer system can: in response to receiving the livestream, allocate a worker to transcode a first mezzanine segment in the set of mezzanine segments of the livestream into a first rendition segment in a particular rendition; and receive a request for a playback segment of the livestream in the particular rendition, wherein the second playback segment defines a second playback interval in the livestream coinciding with the first mezzanine segment. The computer system can then, in response to the second playback interval coinciding with the first mezzanine segment: assign the pre-allocated worker to transcode the first mezzanine segment into the first rendition segment in the particular rendition; and initiate a peer-to-peer stream between the pre-allocated worker and the requesting AV player instance, device, or content delivery network. The third worker can then just-in-time transcode the first rendition segment in the particular rendition.

Additionally or alternatively, the computer system can perform the above steps and instead allocate a worker to transcode the latest mezzanine segment into a particular rendition. In this implementation, the computer system can continuously update the pre-allocated worker with the address of the latest (i.e. most recent) mezzanine segment of the livestream.

In another implementation, in response to receiving a request for the latest mezzanine segment in a particular rendition, the computer system can pre-allocate workers to transcode mezzanine segments that have not yet been cached by the caching worker of the livestream. Therefore, the computer system can reduce latency in transmitting the stream to AV player instances that are requesting a live version of the stream. Thus, the subsequent pre-allocated worker can, in response to the computer system caching the subsequent mezzanine segment in the mezzanine cache: access the subsequent mezzanine segment from the mezzanine cache; and just-in-time transcode the subsequent mezzanine segment into a subsequent rendition segment in the particular rendition.

Additionally, the computer system can track pre-allocated workers and deallocate the workers upon receiving an indication of a termination of the livestream. Therefore, the computer system can: in response to receiving the livestream, allocate a worker to transcode a mezzanine segment in the set of mezzanine segments to a rendition segment in a particular rendition; and, in response to receiving an indication of a termination of the livestream, deallocate the third worker from the transcoding task.

However, the computer system can pre-allocate workers in any other way to improve latency in livestream transcoding and viewing.

23. Storage Optimization

The method S200 enables storage optimization methods in the rendition cache. The method S200 can include recording, for subsequent requests, viewing data for the rendition segment; responsive to the viewing data failing to satisfy a set of retention criteria, deleting the rendition segment from the rendition cache; responsive to receiving a third request for the playback segment from a third audio-video player instance, transcoding the audio-video segment to the rendition of the playback segment to reproduce the rendition segment; and streaming the portion of the rendition segment that coincides with the playback segment to the audio-video player. Generally, just-in-time transcoding enables the computer system to transcode mezzanine segments into requested rendition segments on demand as opposed to in advance and, therefore, allows the computer system to delete rendition segments from the rendition cache while still publishing a stream for the AV file. The computer system can then re-transcode deleted rendition segments if the deleted segments correspond to a requested playback segment.

In one implementation, the computer system records viewing data for each rendition segment. Viewing data can include the total number of requests received for the rendition segment, the number of requests in a specified period of time, the time of the last request for the rendition segment, or any of the above viewing data for sequentially adjacent or otherwise related (e.g. the same rendition encoding) rendition segments. Additionally or alternatively, the method S200 can include using a statistical model to predict future viewing data for the rendition segment. However, viewing data can be collected in any other way.

In one implementation, the computer system can periodically evaluate a set of retention criteria for each rendition segment to determine whether the rendition segment should remain in the rendition cache. The retention criteria can include a minimum number of requests for a rendition segment received within a time interval, or a minimum frequency of requests within a recent period of time, or any other function of the viewing data for a rendition segment. If a rendition segment does not satisfy the retention criteria, the computer system can remove the rendition segment from the rendition cache.

In another implementation, the computer system can: track or calculate a time duration since a last request for a particular rendition segment of the video; and selectively discard (or "delete") the particular rendition segment if this time duration exceeds a threshold duration. For example, the computer system can set a threshold time duration (e.g., five days, thirty days, etc.) since last rendition segment request based on (e.g., proportional to): a duration of the video; a frequency of playback requests for the entire video; a frequency of playback requests for a highest-demand segment of the video; and/or a quantity of renditions of the video extant in the rendition cache. Then, if the computer system fails to receive a request for a playback segment containing a particular rendition segment from any device within the threshold time duration, the computer system can delete the particular rendition segment from the rendition cache.

More specifically, the computer system can: receive a request for a playback segment at the first bitrate-resolution pair in the encoding ladder, in the video from an alternate device; identify a set of mezzanine segments corresponding to the playback segment; assign the set of mezzanine segments to the set of workers for transcoding into a set of video segments according to the first bitrate-resolution pair; store the set of video segments in the rendition cache; and, in response to absence of a request for playback of the set of video segments within a threshold time duration, delete the set of video segments from the rendition cache. Therefore, the computer system can reduce storage complexity by discarding rendition segments that are not in demand by viewers or are requested for periods of time.

In one implementation, the computer system can delete entire renditions of an AV file based on comparative viewing data between renditions of the AV file. For example, if a rendition receives less views compared to another rendition during a time interval, the computer system can delete all of the rendition segments of that rendition. Additionally or alternatively, the computer system can delete rendition segments based on comparative viewing data between temporally different rendition segments within the same rendition. For example, the computer system can delete a rendition segment containing movie credits or an otherwise less frequently viewed segment of video because the rendition segment has received less than a minimum number of views in the last week. In another example, the computer system can delete a set of rendition segments corresponding to a playback segment that is frequently skipped by viewers during streaming of the AV file (e.g., an advertisement in a video). In another implementation, the computer system evaluates a probabilistic cost model comparing the cost of storing a rendition segment with the computational cost of re-transcoding the rendition segment and then deletes the rendition segment when the cost of storing a rendition segment exceeds the cost of re-transcoding the rendition segment.

Thus, the computer system can record, for subsequent requests, viewing data for the playback segment. The computer system can then, in response to the viewing data of the playback segment failing to satisfy a set of retention criteria: identify a consecutive subset of rendition segments in the rendition cache coinciding with the playback interval; and delete the consecutive subset of rendition segments in the first rendition from the rendition cache. The computer system can then, in response to receiving another request for the playback segment, execute Blocks of the method S200 to re-transcode the consecutive subset of rendition segments in the requested rendition.

Additionally or alternatively, the computer system can record, for subsequent requests, viewing data associated with a particular rendition. The computer system can then, in response to the viewing data associated with the particular rendition failing to satisfy a set of retention criteria for the particular rendition: identify a set of rendition segments in the particular rendition in the rendition cache; and delete the set of rendition segments in the particular rendition from the rendition cache.

In another implementation, the computer system can monitor demand or request frequency for a set of playback segments of the video in various bitrate-resolution pairs. For example, if a request frequency for a playback segment of a particular bitrate-resolution pair falls below a threshold frequency (e.g., fifty playback requests in one day etc.), the computer system can clear the rendition cache of the segments of that rendition. More specifically, in response to a request frequency for playback segments—at a particular bitrate-resolution pair in the encoding ladder—of the video falling below a threshold frequency, the computer system can clear a video cache containing video segments at the bitrate-resolution pair. Therefore, the computer system can further reduce storage complexity by retaining rendition segments in a particular rendition in the rendition cache based on audience demand and discarding rendition segments from the rendition cache that are not frequently requested by users or views for playback.

In another implementation, the computer system can re-transcode mezzanine segments that were previously transcoded into rendition segments but also previously deleted due to low request volume, such as in response to the request frequency for these rendition segments subsequently exceeding the threshold frequency or in response to a total request count for these rendition segments subsequently exceeding a threshold count. For example, if a request frequency (e.g., ten requests per day) for playback segments—containing a particular rendition segment at a particular bitrate-resolution pair—exceeds the threshold frequency, the computer system can re-transcode the corresponding mezzanine segment to regenerate the particular rendition segment. However, between prior deletion of the particular rendition segment and re-generation of the particular rendition segment, the computer system can monitor frequency or count of requests for the playback segment within a time interval to identify an increase in popularity of the playback segment at the particular bitrate and resolution.

Therefore, if a playback segment (e.g., a video introduction, etc.) at a particular bitrate and resolution increases in popularity and the computer system receives an increased frequency or count of requests for rendition segments in this playback segment following a period of low demand and request frequency subsequent deletion of rendition segments in this bitrate and resolution, the computer system can initiate re-transcoding of the corresponding mezzanine segments in this bitrate and resolution. For example, in response to the request frequency for the rendition segments at a particular bitrate and resolution in the encoding ladder of the video exceeding the threshold frequency, the computer system can: re-transcode the set of mezzanine segments at this bitrate-resolution pair into a set of video segments; store the set of video segments in the video cache; and serve these video segments to devices as requested. Later, in response to the request frequency for playback segments at this bitrate and resolution pair falling below the threshold frequency, the computer system can clear these video segments—at this bitrate and resolution—from the video cache. Thus, the computer system can further reduce store complexity and re-transcode mezzanine segments based on demand for corresponding rendition segments rather than storing transcoded rendition segments in corresponding rendition caches when demand is low.

In a similar implementation, the computer system can re-transcode deleted rendition segments based on predicted demand for playback segments at particular bitrates and resolutions. For example, the computer system can access a distribution of audience bandwidths representative of likely viewers of the video to predict a demand for playback segments at a particular bitrate and resolution over a future time interval based on historical demand data for the video, videos from the same publisher, and/or videos exhibiting similar characteristics. More specifically, the computer system can monitor for a playback request during a time interval and, based on the predicted demand of the playback segment at the particular bitrate and resolution, release a video segment at the bitrate-resolution pair from the video cache during the time interval. The computer system can then: store the set of video segments at the bitrate-resolution pair in the video cache; and, release the set of video segments to a device for playback in response to receiving a request for a corresponding playback segment from the device during the time interval.

Therefore, the computer system can: predict increased viewer demand for a particular playback segment at a particular bitrate and resolution pair at a future time based on trends in viewership for the video and/or other similar videos; and preemptively initiate re-transcoding of segments of the video in preparation for increased demand for the playback segments of the video at this bitrate and resolution.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
ingesting a video;
extracting a set of video features representing properties of the video;
generating a set of bitrate-resolution pairs for the video based on the set of video features, each bitrate-resolution pair in the set of bitrate-resolution pairs:
defining a bitrate; and
defining a resolution predicted to yield a quality score within a target quality score range for the video encoded at the bitrate and the resolution;
accessing a distribution of audience bandwidths representative of likely viewers of the video;
selecting a subset of bitrate-resolution pairs, from the set of bitrate-resolution pairs, based on the distribution of audience bandwidths;

generating an encoding ladder comprising the subset of bitrate-resolution pairs;

transmitting a manifest file representing the encoding ladder to a first playback device prior to transcoding a first playback segment in the video;

receiving a first request for the first playback segment, at a first bitrate-resolution pair in the encoding ladder, from a first playback device based on the manifest file; and in response to detecting absence of video segments, at the first bitrate-resolution pair and corresponding to the first playback segment, in a first rendition cache:
  identifying a first set of mezzanine segments, in the video, corresponding to the first playback segment;
  assigning the first set of mezzanine segments to a set of workers for transcoding into a first set of video segments according to the first bitrate-resolution pair;
  storing the first set of video segments in the first rendition cache; and
  based on the first request, releasing the first set of video segments to the first playback device.

2. The method of claim 1:

further comprising, generating a feature vector for the video based on the set of video features; and wherein generating the set of bitrate-resolution pairs based on the set of video features comprises passing the feature vector into a convex hull estimation model to generate the set of bitrate-resolution pairs.

3. The method of claim 1, further comprising:

accessing a set of training video segments; and for each training video segment in the set of training video segments:
  extracting a set of training video features representing properties of the training video segment;
  generating a training feature vector for the training video segment based on the set of training video features;
  encoding a set of trial encodes of the training video segment, the trial encodes spanning a set of encoding bitrates;
  calculating a quality score of each trial encode in the set of trial encodes according to a quality metric to generate a set of quality scores;
  for each encoding bitrate in the set of encoding bitrates:
    identifying a subset of trial encodes characterized by the encoding bitrate; and
    selecting a trial encode for a convex hull of the training video from the subset of trial encodes, the trial encode characterized by a maximum quality score relative to the subset of trial encodes;
  generating a training example comprising the training feature vector and the convex hull of the training video segment;
  storing the training example in a set of training examples; and
  training the convex hull estimation model based on the set of training examples.

4. The method of claim 1:

further comprising:

selecting a highest bitrate-resolution pair for the encoding ladder from the set of bitrate-resolution pairs, the highest bitrate-resolution pair defining a rendition of a highest bitrate; and selecting a lowest bitrate-resolution pair for the encoding ladder from the set of bitrate-resolution pairs, the lowest bitrate-resolution pair defining a rendition of a lowest bitrate;

wherein selecting the subset of bitrate-resolution pairs from the set of bitrate-resolution pairs comprises selecting the subset of bitrate-resolution pairs from the set of bitrate-resolution pairs based on the distribution of audience bandwidths, the subset of bitrate-resolution pairs defining renditions of bitrates less than the highest bitrate and greater than the lowest bitrate; and wherein generating the encoding ladder comprises generating the encoding ladder, for the video segment, comprising the highest bitrate-resolution pair, the lowest bitrate-resolution pair, and the subset of bitrate-resolution pairs.

5. The method of claim 4, wherein selecting the highest bitrate-resolution pair in the set of bitrate-resolution pairs comprises:

for each bitrate-resolution pair in the set of bitrate-resolution pairs, predicting a quality score characterizing the bitrate-resolution pair according to a quality metric;

identifying, in the set of bitrate-resolution pairs, a set of high-quality bitrate-resolution pairs characterized by quality scores greater than a threshold quality score; and selecting the highest bitrate-resolution pair from the set of high-quality bitrate-resolution pairs, the highest bitrate-resolution pair defining a minimum bitrate in the set of high-quality bitrate resolution pairs.

6. The method of claim 1, further comprising:

receiving a second request for the first playback segment, at a second bitrate-resolution pair in the encoding ladder, in the video from a second playback device;

identifying that a second set of video segments at the second bitrate-resolution pair is stored in the first rendition cache; and releasing the second set of video segments from the first rendition cache to the second playback device.

7. The method of claim 6, further comprising:

streaming the second set of video segments to the second playback device; and in response to absence of a request for the first set of video segments within a threshold time duration following receipt of the second request:
  preserving the second set of video segments in the first rendition cache; and
  deleting the first set of video segments from the first rendition cache.

8. The method of claim 1, further comprising:

receiving a second request for the first playback segment, at a second bitrate-resolution pair in the encoding ladder, in the video from a second playback device;

identifying that the first set of mezzanine segments corresponding to the first playback segment are contemporaneously transcoding into a second set of video segments according to the second bitrate-resolution pair; and in response to completion of transcoding into the second set of video segments, transmitting the second set of video segments to the second playback device.

9. The method of claim 8, further comprising:

receiving a third request for a second playback segment, at the first bitrate-resolution pair in the encoding ladder, in the video from a second playback device;

identifying a second set of mezzanine segments corresponding to the second playback segment;
assigning the second set of mezzanine segments to the set of workers for transcoding into a fourth set of video segments according to the first bitrate-resolution pair;
storing the fourth set of video segments in the first rendition cache; and
in response to absence of a request for playback of the fourth set of video segments within a threshold time duration following the second time, deleting the fourth set of video segments from the first rendition cache.

10. The method of claim 1, further comprising:
ingesting a second video, the second video succeeding the video in a video stream;
extracting a second set of video features representing properties of the second video;
generating a second set of bitrate-resolution pairs for the second video based on the second set of video features, each bitrate-resolution pair in the second set of bitrate-resolution pairs:
defining a bitrate; and
defining a resolution predicted to yield a quality score within the target quality score range for the second video encoded at the bitrate and the resolution;
populating a second encoding ladder, for the second video, with a second subset of bitrate-resolution pairs, from the second set of bitrate-resolution pairs, based on the distribution of audience bandwidths;
receiving a second request for a second playback segment, at a second bitrate-resolution pair in the second encoding ladder, in the second video from the first playback device; and
in response to absence of video segments, at the second bitrate-resolution pair and corresponding to the second playback segment, in a second video cache:
identifying a second set of mezzanine segments, in the second video, corresponding to the second playback segment;
assigning the second set of mezzanine segments to a second set of machines for transcoding into a second set of video segments according to the second bitrate-resolution pair;
storing the second set of video segments in the first rendition cache; and
based on the second request, releasing the second set of video segments to the first playback device.

11. A method comprising:
ingesting a video;
extracting a set of video features representing properties of the video;
generating a set of bitrate-resolution pairs for the video based on the set of video features, each bitrate-resolution pair in the set of bitrate-resolution pairs:
defining a bitrate; and
defining a resolution predicted to yield a quality score within a target quality score range for the video encoded at the bitrate and the resolution;
accessing a distribution of audience bandwidths representative of likely viewers of the video;
selecting a subset of bitrate-resolution pairs, from the set of bitrate-resolution pairs, based on the distribution of audience bandwidths;
generating an encoding ladder comprising the subset of bitrate-resolution pairs;
segmenting the video into a set of mezzanine segments;
publishing a manifest file representing the encoding ladder prior to transcoding the set of mezzanine segments;
for each bitrate-resolution pair in the encoding ladder:
assigning the set of mezzanine segments to a set of machines for transcoding into a set of video segments according to the bitrate-resolution pair; and
storing the set of video segments in a video cache;
during a first time period, in response to receiving a first request for a first playback segment, at a first bitrate-resolution pair in the encoding ladder, of the video from a first playback device:
identifying a first set of video segments, corresponding to the first playback segment at the first bitrate-resolution pair, in the video cache; and
releasing the first set of video segments to the first playback device; and
during a second time period succeeding the first time period, in response to a first request frequency for playback segments, at the first bitrate-resolution pair in the encoding ladder, of the video falling below a threshold frequency, clearing the first set of video segments from the video cache.

12. The method of claim 11:
further comprising:
selecting a highest bitrate-resolution pair for the encoding ladder from the set of bitrate-resolution pairs, the highest bitrate-resolution pair defining a rendition of a highest bitrate; and
selecting a lowest bitrate-resolution pair for the encoding ladder from the set of bitrate-resolution pairs, the lowest bitrate-resolution pair defining a rendition of a lowest bitrate;
wherein selecting the subset of bitrate-resolution pairs from the set of bitrate-resolution pairs comprises selecting the subset of bitrate-resolution pairs from the set of bitrate-resolution pairs based on the distribution of audience bandwidths, the subset of bitrate-resolution pairs defining renditions of bitrates less than the highest bitrate and greater than the lowest bitrate; and
wherein generating the encoding ladder comprises generating the encoding ladder, for the video segment, comprising the highest bitrate-resolution pair, the lowest bitrate-resolution pair, and the subset of bitrate-resolution pairs.

13. The method of claim 11, further comprising:
encoding a set of renditions of the set of mezzanine segments, each rendition comprising an encoding of the set of mezzanine segments characterized by a bitrate and a resolution of a bitrate-resolution pair in the encoding ladder.

14. The method of claim 11, further comprising:
identifying a set of keyframe timestamps in the video; and
segmenting the video to define the set of mezzanine segments based on the set of keyframe timestamps.

15. The method of claim 11, further comprising, during a third time period succeeding the second time period:
re-transcoding the set of mezzanine segments into a second set of video segments at the first bitrate-resolution pair based on a predicted video demand at a demand time;
storing the second set of video segments at the first bitrate-resolution pair in the video cache; and
in response to receiving a second request for a second playback segment at the demand time, releasing the second set of video segments to a second playback device.

16. The method of claim 11:
further comprising, during a third time period succeeding the second time period:

in response to the first request frequency for the playback segments, at the first bitrate-resolution pair in the encoding ladder, of the video exceeding the threshold frequency, re-transcoding the set of mezzanine segments into a second set of video segments at the first bitrate-resolution pair; and storing the second set of video segments at the second bitrate-resolution pair in the video cache; and further comprising, during a fourth time period succeeding the third time period, in response to a second request frequency for playback segments, at the first bitrate-resolution pair in the encoding ladder, of the video falling below the threshold frequency clearing the second set of video segments from the video cache.

17. The method of claim 11, further comprising:

during a third time period succeeding the second time period, in response to a second request frequency for playback segments, at the first bitrate-resolution pair in the encoding ladder, of the video exceeding the threshold frequency:
- re-transcoding the set of mezzanine segments into a second set of video segments at the first bitrate-resolution pair; and
- storing the second set of video segments in the video cache.

18. A method for streaming an audio-video file comprising:

storing a set of mezzanine segments corresponding to the audio-video file, each mezzanine segment in the set of mezzanine segments defining a portion of the audio-video file;

generating a manifest file for the audio-video file representing:
- a first rendition of the audio-video file characterized by a first bitrate and a first resolution; and
- a second rendition of the audio-video file characterized by a second bitrate less than the first bitrate and a second resolution less than the first resolution;

transmitting the manifest file to a first playback device prior to transcoding a first playback segment, in the audio-video file, in the first rendition;

receiving a first playback request for the first playback segment in the first rendition from a first playback device based on the manifest file;

in response to detecting absence of the first playback segment in the first rendition in a rendition cache:
- transcoding the first playback segment in the first rendition from a first mezzanine segment in the set of mezzanine segments at a first worker;
- initiating a first stream between the first worker and the first playback device; and
- storing the playback segment in the first rendition in the rendition cache;

predicting a change from the first rendition to the second rendition in a second request from the first playback device by:
- identifying a second mezzanine segment in the set of mezzanine segments subsequent to the first mezzanine segment;
- transcoding the second playback segment in the second rendition from the second mezzanine segment at a second worker; and
- storing the second playback segment in the second rendition in the rendition cache; and in response to receiving a second request for the second playback segment in the second rendition from the first playback device based on the manifest file, transmitting the second playback segment in the second rendition to the first playback device from the rendition cache.

19. The method of claim 18, further comprising, at the first playback device, in response to a change in viewing conditions:
- adapting a first requested bitrate and a first requested resolution to the second bitrate and the second resolution; and
- transmitting the second request for the second playback segment in the second rendition.

20. The method of claim 18, wherein, in response to receiving the second request for the second playback segment in the second rendition from the first playback device based on the manifest file, transmitting the second playback segment in the second rendition to the first playback device from the rendition cache comprises:
- receiving the second request for the second playback segment in the second rendition from the first playback device; and
- in response to detecting the second playback segment in the second rendition in the rendition cache, transmitting the second playback segment in the second rendition to the first playback device from the rendition cache.

* * * * *